United States Patent
Venkataraman et al.

(10) Patent No.: US 12,254,191 B2
(45) Date of Patent: Mar. 18, 2025

(54) SECURE APPLICATIONS IN COMPUTATIONAL STORAGE DEVICES

(71) Applicant: Samsung Electronics Co., Ltd., Suwon-si (KR)

(72) Inventors: Gayathiri Venkataraman, Santa Clara, CA (US); Vishwanath Maram, San Jose, CA (US); Matthew Shaun Bryson, Los Gatos, CA (US); Sungwook Ryu, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 139 days.

(21) Appl. No.: 17/492,544

(22) Filed: Oct. 1, 2021

(65) Prior Publication Data

US 2022/0308770 A1    Sep. 29, 2022

Related U.S. Application Data

(60) Provisional application No. 63/165,027, filed on Mar. 23, 2021.

(51) Int. Cl.
*G06F 3/00* (2006.01)
*G06F 3/06* (2006.01)
(Continued)

(52) U.S. Cl.
CPC .......... *G06F 3/0622* (2013.01); *G06F 3/0644* (2013.01); *G06F 3/0673* (2013.01); *G06F 9/44557* (2013.01); *G06F 9/48* (2013.01)

(58) Field of Classification Search
CPC ....................................................... G06F 9/54
(Continued)

(56) References Cited

U.S. PATENT DOCUMENTS 5,546,535 A * 8/1996 Stallmo ............... G06F 11/2089
714/42
6,091,012 A * 7/2000 Takahashi ............ G10H 1/0091
84/626

(Continued)

FOREIGN PATENT DOCUMENTS

KR    20200122118 A    10/2020

OTHER PUBLICATIONS

Seokho Son, A Price- and-Time-Slot-Negotiation Mechanism for Cloud Service Reservations. (Year: 2012).*

(Continued)

*Primary Examiner* — Lechi Truong
(74) *Attorney, Agent, or Firm* — Renaissance IP Law Group LLP

(57) ABSTRACT

A method includes receiving, at a controller of a storage device, a command reserving a program slot of a processing device of the storage device to an application. The method further includes storing, by the controller of the storage device, an association between the program slot and the application. The method further includes receiving, at the controller of the storage device, a request to load the application into the execution slot. The method further includes loading, by the controller of the storage device, the application into the program slot based on the association and the request. The method further includes executing, at the processing device of the storage device, the application in the program slot.

20 Claims, 23 Drawing Sheets

(51) Int. Cl.
  *G06F 9/445* (2018.01)
  *G06F 9/48* (2006.01)
(58) Field of Classification Search
  USPC .......................................................... 719/310
  See application file for complete search history.

(56) References Cited

U.S. PATENT DOCUMENTS

| | | | |
|---|---|---|---|
| 6,301,430 B1* | 10/2001 | Oguro | H04N 5/913 |
| | | | 386/253 |
| 6,490,255 B1* | 12/2002 | Kiriha | H04L 41/0226 |
| | | | 370/254 |
| 6,782,550 B1* | 8/2004 | Cao | H04N 21/4335 |
| | | | 725/38 |
| 7,620,941 B1* | 11/2009 | Leventhal | G06F 11/3466 |
| | | | 717/124 |
| 9,507,702 B2 | 11/2016 | Chang | |
| 9,785,381 B2* | 10/2017 | Shiga | G06F 3/0629 |
| 10,798,108 B2 | 10/2020 | Snyder | |
| 10,942,676 B2 | 3/2021 | Jung et al. | |
| 10,949,361 B1 | 3/2021 | Isakovich | |
| 11,269,537 B2* | 3/2022 | Prohofsky | G06F 3/0659 |
| 2002/0110353 A1* | 8/2002 | Potrebic | H04N 21/4335 |
| 2002/0184372 A1* | 12/2002 | Ishikawa | G06F 9/445 |
| | | | 709/227 |
| 2003/0208462 A1* | 11/2003 | Pocock | G06F 3/0608 |
| 2006/0047922 A1* | 3/2006 | Johnson | G06F 16/10 |
| | | | 711/170 |
| 2006/0129990 A1* | 6/2006 | Flanagan | G06F 11/3688 |
| | | | 717/124 |
| 2006/0136548 A1* | 6/2006 | Nishio | H04W 12/08 |
| | | | 709/203 |
| 2008/0222366 A1* | 9/2008 | Hieda | G06F 12/1036 |
| | | | 711/E12.001 |
| 2009/0013157 A1 | 1/2009 | Beaule | |
| 2010/0030990 A1* | 2/2010 | Asai | G07F 7/1008 |
| | | | 711/115 |
| 2010/0191908 A1* | 7/2010 | Yamakawa | G06F 3/0653 |
| | | | 711/170 |
| 2010/0293347 A1* | 11/2010 | Luttrell | G06F 9/3834 |
| | | | 711/170 |
| 2011/0173251 A1* | 7/2011 | Sandhu | G06F 9/455 |
| | | | 709/203 |
| 2013/0219173 A1* | 8/2013 | Ho | H04W 12/086 |
| | | | 713/157 |
| 2014/0082194 A1* | 3/2014 | Sasmita | H04L 43/0876 |
| | | | 709/225 |
| 2014/0092883 A1* | 4/2014 | Desai | H04W 72/20 |
| | | | 370/337 |
| 2014/0149692 A1 | 5/2014 | Kim et al. | |
| 2014/0280486 A1* | 9/2014 | Seay | H04L 67/02 |
| | | | 709/203 |
| 2014/0281776 A1* | 9/2014 | Champion | G01R 31/31919 |
| | | | 714/729 |
| 2015/0040119 A1* | 2/2015 | Kuroki | G06F 8/60 |
| | | | 717/174 |
| 2015/0142574 A1* | 5/2015 | Hardin | H04W 4/02 |
| | | | 705/14.58 |
| 2017/0351600 A1* | 12/2017 | Pintiysky | G06F 12/0223 |
| 2018/0060244 A1 | 3/2018 | Godard et al. | |
| 2020/0333980 A1 | 10/2020 | Lim | |
| 2021/0055961 A1 | 2/2021 | Shah et al. | |
| 2024/0281146 A1* | 8/2024 | Zhang | G06F 9/5016 |

OTHER PUBLICATIONS

Frank McKeen, Innovative Instructions and Software Model for Isolated Execution. (Year: 2013).*

Qiaoyang Ye, User Association for Load Balancing in Heterogeneous Cellular Networks. (Year: 2013).*

* cited by examiner

| Slot | Reserved to | In slot | Reservation Authority Level |
|---|---|---|---|
| 1 | None | Application 2 | Admin Level |
| 2 | Application 1 | Empty | Admin Level |

FIG. 11

SECURE APPLICATIONS IN COMPUTATIONAL STORAGE DEVICES

CROSS-REFERENCE TO RELATED APPLICATION(S)

The present application claims priority to and the benefit of U.S. Provisional Application No. 63/165,027, filed Mar. 23, 2021 entitled "Systems, methods, and apparatus for secure program domains for computational storage," the entire contents of all which is incorporated herein by reference.

FIELD

The present disclosure generally relates to systems and methods for virtual computational storage devices.

BACKGROUND

Computational storage devices provide computation functions and data storage. Accordingly, a host device may store data at and offload computations to a computational storage device. In some implementations, various programs may be executed at the computational storage device. However, introduction of executable programs to the computational storage device may present an increased security risk to components of the computational storage device.

The above information disclosed in this background section is only for enhancement of understanding of the background of the disclosure and therefore it may contain information that does not constitute prior art.

SUMMARY

In various embodiments, described herein include systems, methods, and apparatuses related to virtual computational storage devices.

A method includes receiving, at a controller of a storage device, a command reserving a program slot of a processing device of the storage device to an application. The method further includes storing, by the controller of the storage device, an association between the program slot and the application. The method further includes receiving, at the controller of the storage device, a request to load the application into the program slot. The method further includes loading, by the controller of the storage device, the application into the program slot based on the association and the request. The method further includes executing, at the processing device of the storage device, the application in the program slot.

A computational storage device includes a processing device, a memory, and a controller. The controller is configured to receive a command reserving a program slot of the processing device to an application. The controller is further configured to store an association between the program slot and the application in the memory. The controller is further configured to receive a request to load the application into the program slot. The controller is further configured to load the application into the program slot based on the association and the request. The controller is further configured to initiate execution of the application in the program slot at the processing device.

A computer readable storage device stores instructions executable by a controller to receive a command reserving a program slot of a processing device to an application. The instructions are further executable to store an association between the program slot and the application in a memory. The instructions are further executable to receive a request to load the application into the program slot. The instructions are further executable to load the application into the program slot based on the association and the request. The instructions are further executable to initiate execution of the application in the program slot at the processing device.

BRIEF DESCRIPTION OF THE DRAWINGS

The above-mentioned aspects and other aspects of the present techniques will be better understood when the present application is read in view of the following figures in which like numbers indicate similar or identical elements:

FIG. 11 is a diagram illustrating a data structure that stores data associated with program slots.

Figure 1:
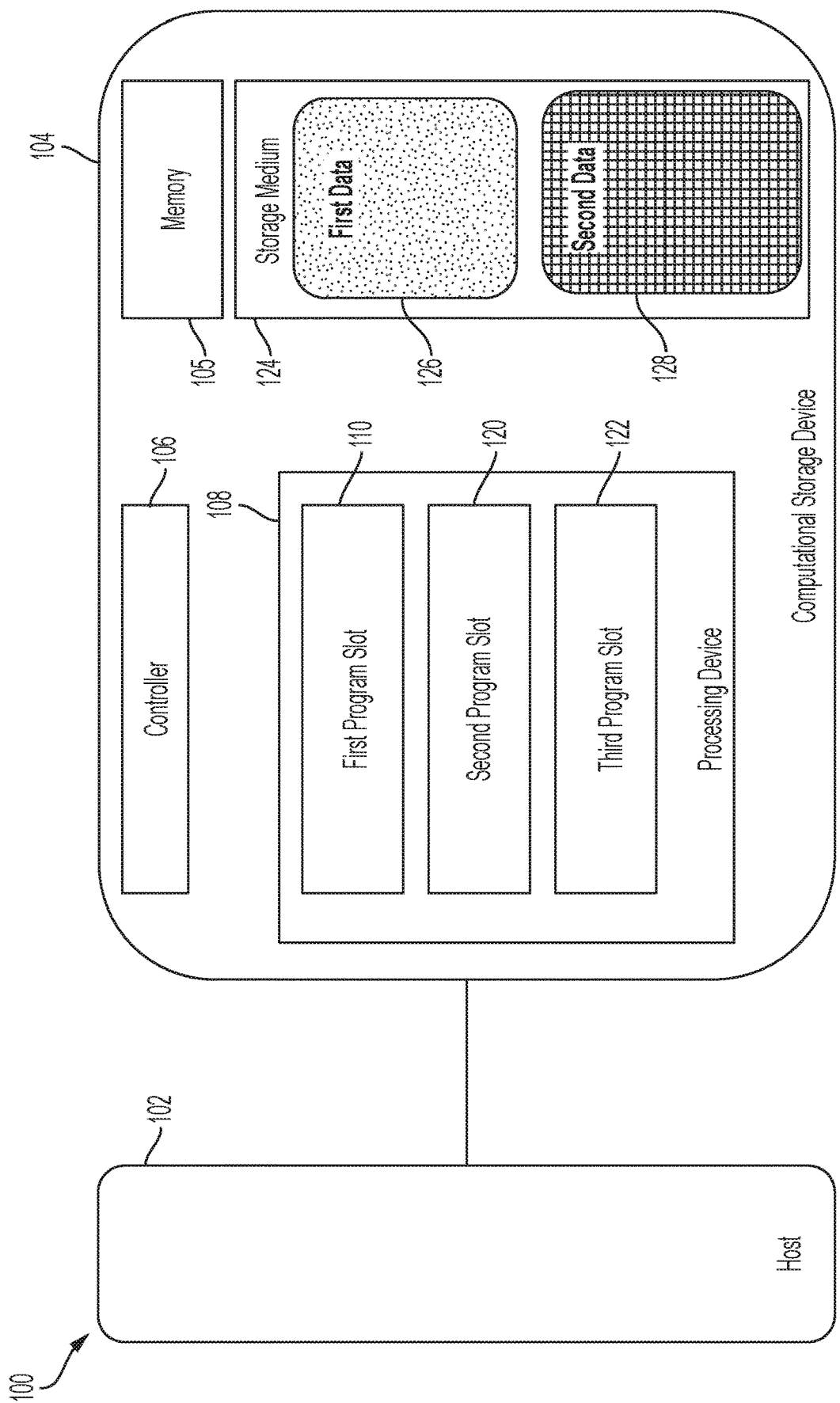
FIG. 1 is a block diagram of a system for providing secure applications in computational storage devices.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF DRAWINGS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As used herein, a computational storage device refers to a storage device that supports computational tasks. For example, a computational storage device may include a storage element (e.g., non-volatile memory, such as flash memory, a hard disk drive, etc.) and a compute element (e.g., a central processor unit (CPU), graphics processor unit (GPU), a field programmable gate array (FPGA), an application specific integrated circuit (ASIC) (such as a tensor processing unit), processor core, etc.) and be configured to support storage of data at the compute element and execution of computational tasks at the compute element. Accordingly, a computational storage device may provide storage capabilities to a computational storage client (e.g., a computing device) and may support offloading of computational tasks from the computational storage client to the computational storage device.

Systems and methods for increasing security in a computational storage device are disclosed herein. FIG. 1 illustrates an example system 100 that includes a computational storage device 104 in communication with a host 102. The computational storage device 104 includes a controller 106, a processing device 108, a memory 105, and a storage medium 124. The controller 106 may include an ASIC, FPGA, central processor unit, or other processing unit configured to process input and output operations associated with the storage medium 124. For example, in response to a write command from the host 102, the controller 106 may read data from the host 102 and write the data into the storage medium. As another example, in response to a read command from the host 102, the controller 106 may read data from the storage medium 124 and write the data to the host 102. In addition to processing input and output operations, the controller 106 may process commands associated with computational tasks. These commands associated with computational tasks may include commands to load programs into the processing device 108, commands to set one or more permissions associated with such programs, or a combination thereof.

The storage medium 124 may include a non-volatile computer-readable storage medium, a volatile computer-readable storage medium, or a combination thereof. In the illustrated example, the storage medium 124 stores first data 126 and second data 128. The first data 126 and the second data 128 may correspond to namespaces, files, pages, logical block address ranges, other units of data, or a combination thereof. While the storage medium 124 is illustrated with two units of data, it should be noted that the storage medium 124 may include different numbers of data units.

The memory 105 may include a volatile computer-readable storage medium, a non-volatile computer readable storage medium, or a combination thereof. The memory 105 is configured to operate as an operational memory and to store program data for programs executing at the processing device 108. In some implementations, the memory 105 and the storage medium 124 may be distinguished by how data units are addressed in the respective devices. For example, the memory 105 may be byte addressable whereas the storage medium 124 may be block addressable. In some implementations, the computational storage device 104 may include a single computer readable storage medium for long term storage as well as for use as operational memory.

The processing device 108 may include an ASIC, FPGA, central processor unit, graphics processor unit, other type of processor unit, or a combination thereof. The processing device 108 is configured to execute applications loaded into program slots. The processing device 108 of the system 100 is illustrated with a first program slot 110, a second program slot 120, and a third program slot 122. Other numbers of program slots are possible. The program slots 110, 120, 122 may correspond to logical representations of capacity of the processing device 108 and the processing device 108 may execute a number of programs up to the number of program slots. These logical representations may be maintained by the controller 106. Metadata corresponding to each program slot 110, 120, 122 may be stored by the controller 106 in the memory 105 in the storage medium 124, or a combination thereof. The metadata corresponding to the program slots may indicate a slot identifier, a program reserved to the slot, one or more permissions associated with the slot, or a combination thereof. The one or more permissions associated with the slot may identify entities (e.g., hosts, programs, etc.) authorized to load a program into the slot, to execute a program in the slot, or a combination thereof. The number of program slots included in the processing device 108 may be configurable or may be based on some underlying hardware feature of the processing device 108. For example, the number of program slots may be based on a number of cores included in the processing device 108 or another hardware feature. In some implementations, each program slot corresponds to a memory address or range in a memory, such as the memory 105, and loading an application into the program slot includes storing the application (or a reference, such as a pointer, to the application) in the corresponding address or range for execution by the processing device 108.

While not shown, the computational storage device 104 may include various additional components, such as a host interface layer, a flash translation layer, etc. For example, a host interface layer may be configured to translate commands received from the host 102 to a form recognized by the controller 106. Such translation may include translating an addressing scheme used by the host 102 to an addressing scheme used by the controller 106. The flash translation layer may translate commands from the controller 106 to a format recognized by the storage medium 124. Such translation may include translating an addressing scheme used by the host 102 to an addressing scheme used by the storage medium 124. Additionally, more than one of the components shown may be included in the computational storage device 104. For example, the computational storage device 104 may include more than one memory 105, more than one storage medium 124, more than one processing device 108, more than one controller 106, etc. Further, while not shown, the computational storage device 104 may include various connections between components. For example, components of the computational storage device 104 may be connected by a bus, by one or more direct connections, or a combination thereof. In addition, some components illustrated in FIG. 1 may be combined. For example, the controller 106 and the processing device 108 may be implemented the same processing device (or processing devices).

In operation, the controller 106 manages rights associated with the program slots 110, 120, 122 and rights associated with programs. For example, the controller 106 may enforce a reservation of a program slot to an application and may prevent unauthorized programs from being loaded into the program slot. As another example, the controller 106 may manage access rights of a program to the storage medium 124, to the memory 105, or a combination thereof. As another example, the controller 106 may manage access rights of various entities (e.g., hosts, programs, etc.) to load and/or execute a program in one of the program slots 110, 120, 122. Thus, the controller 106 may prevent unauthorized use of various resources of the computational storage device 104. Prevention of such unauthorized uses may be useful in various contexts such as multi-tenant environments in which programs from different vendors are loaded into program slots 110, 120, 122. Additionally, the controller 106 may manage rights associated with one program loading a program into one of the program slots 110, 120, 122 and initiating execution. Accordingly, the computational storage device 104 may support relatively complex work flows while maintaining security. An example of one such complex workflow is one in which a checksum program selectively loads and executes a repair program. In some implementations, the controller 106 operates according to a Non-Volatile Memory express (NVMe) protocol.

It should be noted that while the computational storage device 104 is described as a physical device, the computational storage device 104 and/or one or more components thereof may correspond to virtual devices provided by one or more underlying physical devices. For example, a hypervisor executing in a computing system may provide the computational storage device 104 to the host 102. The host 102 may likewise correspond to a physical or a virtual computing device.

Figure 2A:
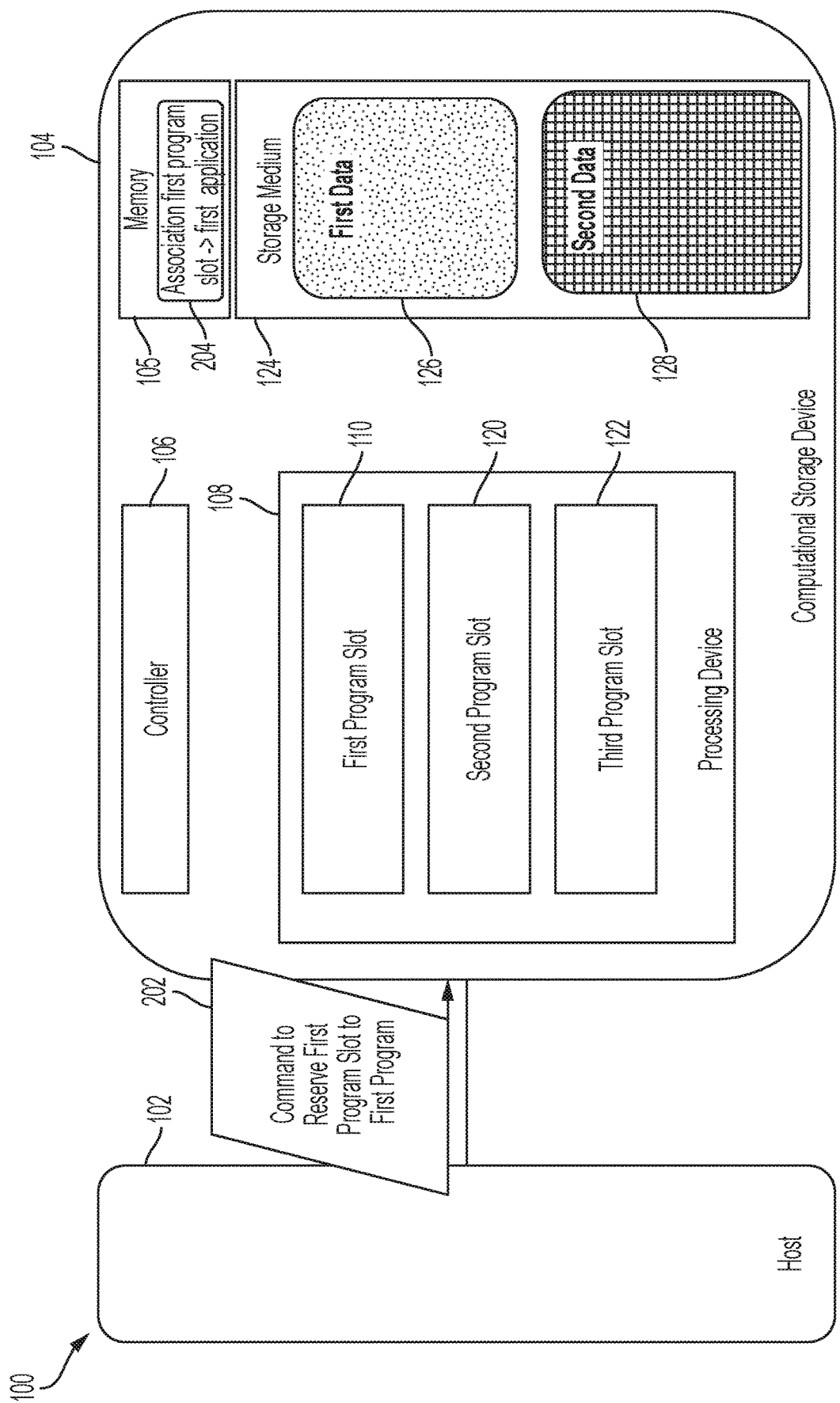
FIGS. 2A, 2B, and 2C are diagrams depicting various operations related to reserving a program slot to a particular application in the system.
Figure 2B:
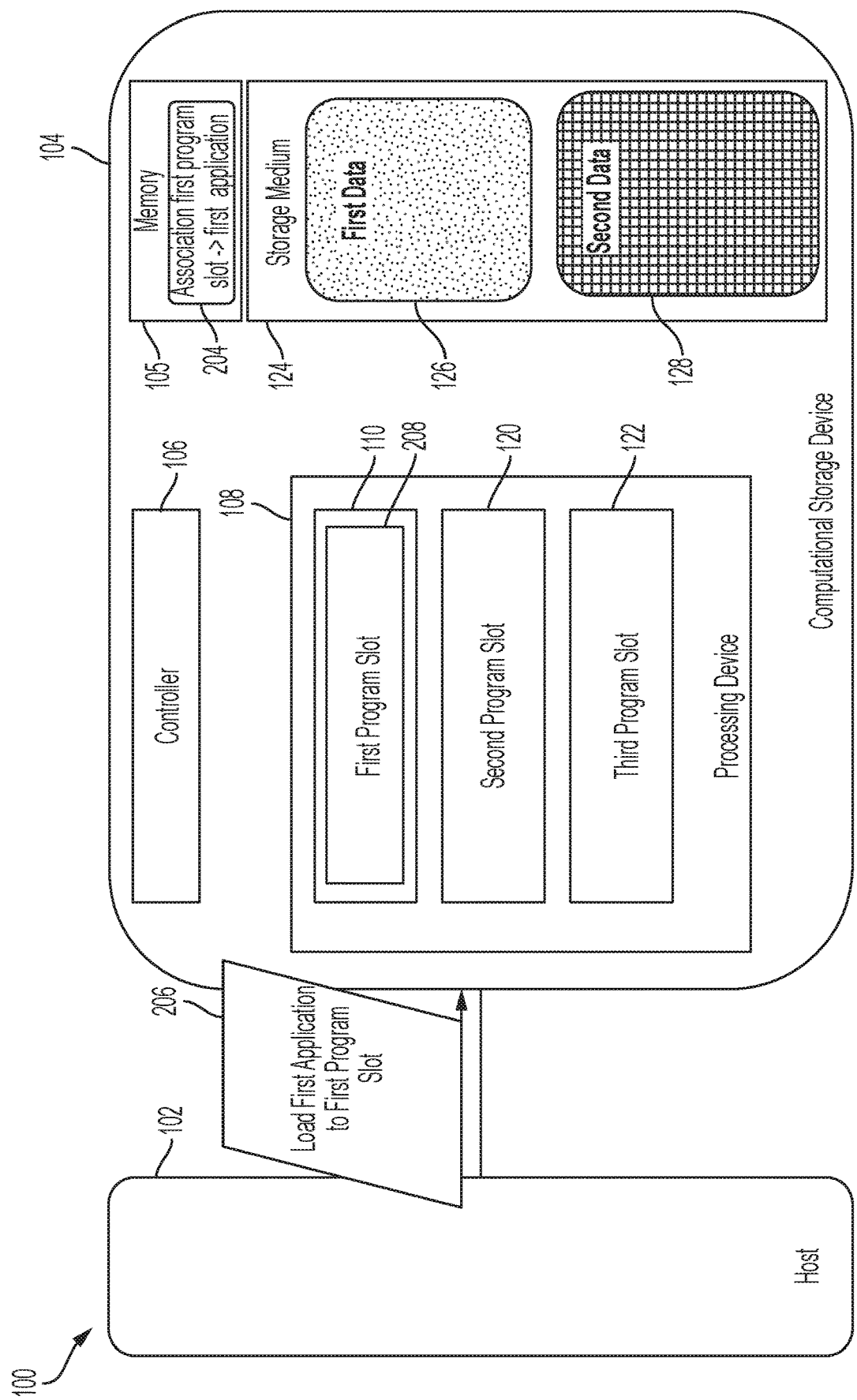
Figure 2C:
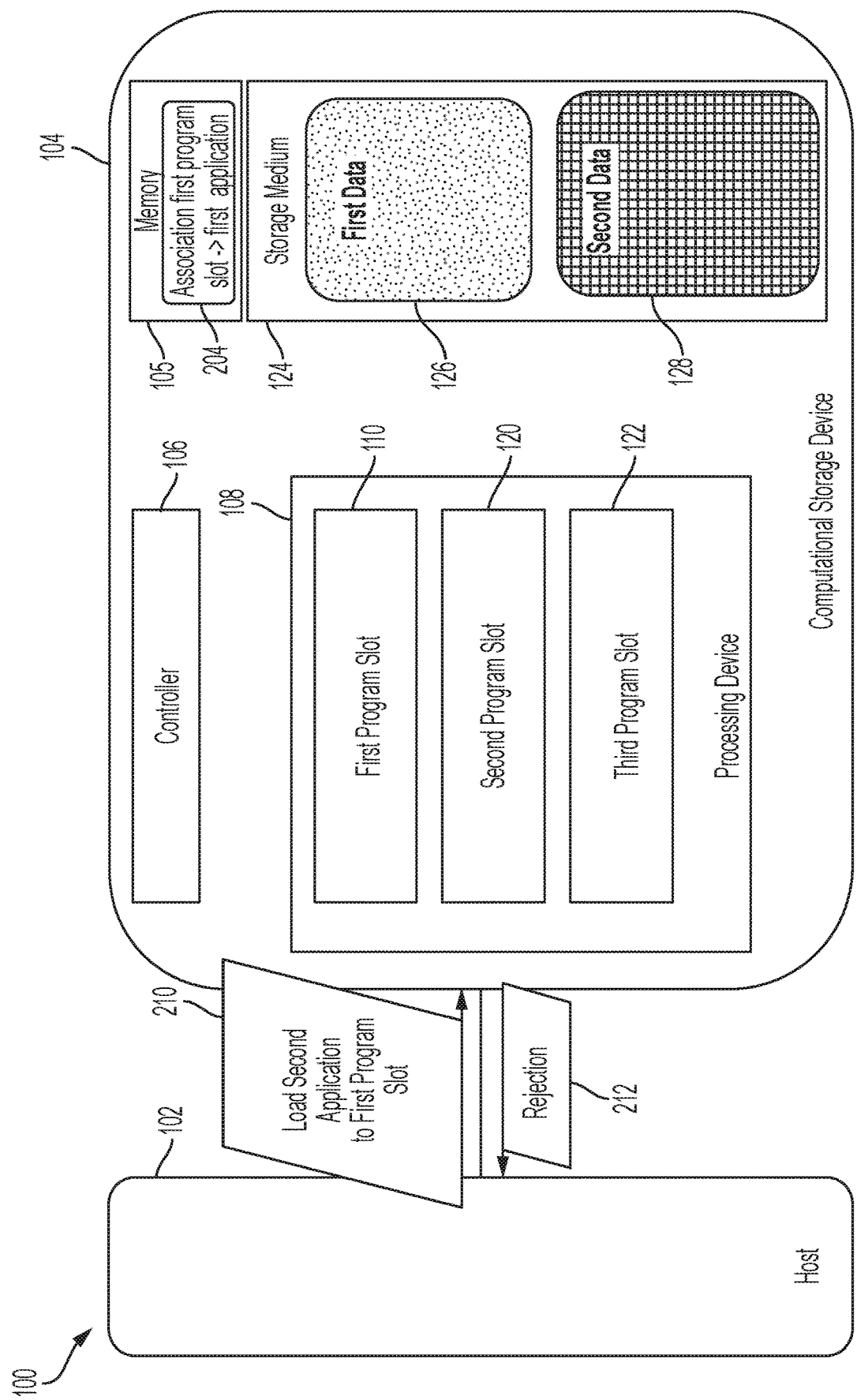

FIG. 2A-2C are diagrams of the system 100 showing the controller 106 supporting a slot reservation function. In the example illustrated in FIG. 2A, the host 102 sends a command 202 to reserve the first program slot 110 for a first application 208 (shown in FIG. 2B) to the computational storage device 104. The controller 106 receives the command 202 and stores an association 204 between the first program slot and the first application 208 in the memory 105. The association 204 may correspond to a reservation of the first program slot 110 to the first application 208. Storing the association 204 may include updating metadata associated with the first program slot 110. It should be noted that this metadata (and the association 204) may be stored in other locations rather than in the memory 105. For example, the metadata may be stored in the storage medium 124, in a memory of the processing device 108, or in another location.

In some implementations, the command 202 may originate from a different source than the host 102. For example, the command 202 may originate from a program executing in one of the program slots 110, 120, 122. The controller 106 may be configured to determine whether a source of the command 202 has authorization to issue the command 202. For example, as described further below with respect to FIG. 10, metadata associated with a slot may indicate which entities and/or permission levels may reserve a particular slot. The controller 106 may determine whether the command 202 is issued by an entity authorized by the metadata associated with the first program slot 110 or by an entity associated with a permission level authorized by the metadata associated with the first program slot 110. As described further below with respect to FIG. 9, the computational storage device 104 may store metadata associated with programs and such programs may indicate permission levels associated with the programs. In response to determining that the entity issuing the command 202 is authorized to issue the command 202, the controller 106 may store the association 204 as shown. However, should the controller 106 determine that the entity is unauthorized, the controller 106 may reject the command 202. Rejecting the command 202 may include sending a rejection message to the entity. As described further below, metadata associated with programs and slots may be set by the host 102, programs executing in the processing device 108, or a combination thereof.

In the example illustrated in FIG. 2B, the host 102 sends a command 206 to load the first application 208 into the first program slot 110. In response to the command 206, the controller 106 determines whether the first program slot 110 is available to the first application 208 by consulting the metadata associated with the first program slot 110. In response to the first application 208 corresponding to the reservation indicated by the association 204, the controller 106 may load the first application 208 into the first program slot. Loading the first application 208 into the first program slot 110 may include downloading the first application 208 from an external source. The external source may be indicated in the command 206. Alternatively, loading the first application 208 may include retrieving the first application 208 from the storage medium 124.

In situations in which the controller 106 determines that a command to load an application is inconsistent with a reservation, the controller 106 may reject the command. For example, FIG. 2C depicts the host 102 sending a command 210 to load a second application to the first program slot 110. In response to the association 204 indicating that the first program slot 110 is reserved to the first application 208, the controller 106 rejects the command 210 and does not load the second application into the first program slot 110. In the illustrated example, the controller 106 sends a rejection message 212 to the host 102 indicating that the command 210 has been rejected.

While FIGS. 2B and 2C depict load commands originating from the host 102, as described further below, applications may issue load commands as well. In such situations, the controller 106 may determine whether the load commands are consistent with reservations stored in program slot metadata as described above.

Accordingly, FIGS. 2A-2C illustrate how the system 100 may reserve program slots to applications. Such reservations may ensure that a priority application has resources to execute when needed. In situations in which multiple entities load applications into the processing device 108 (e.g., in a multi-tenant system), one tenant may be prevented from consuming all of available program slots and blocking an important application of another tenant.

Figure 3:
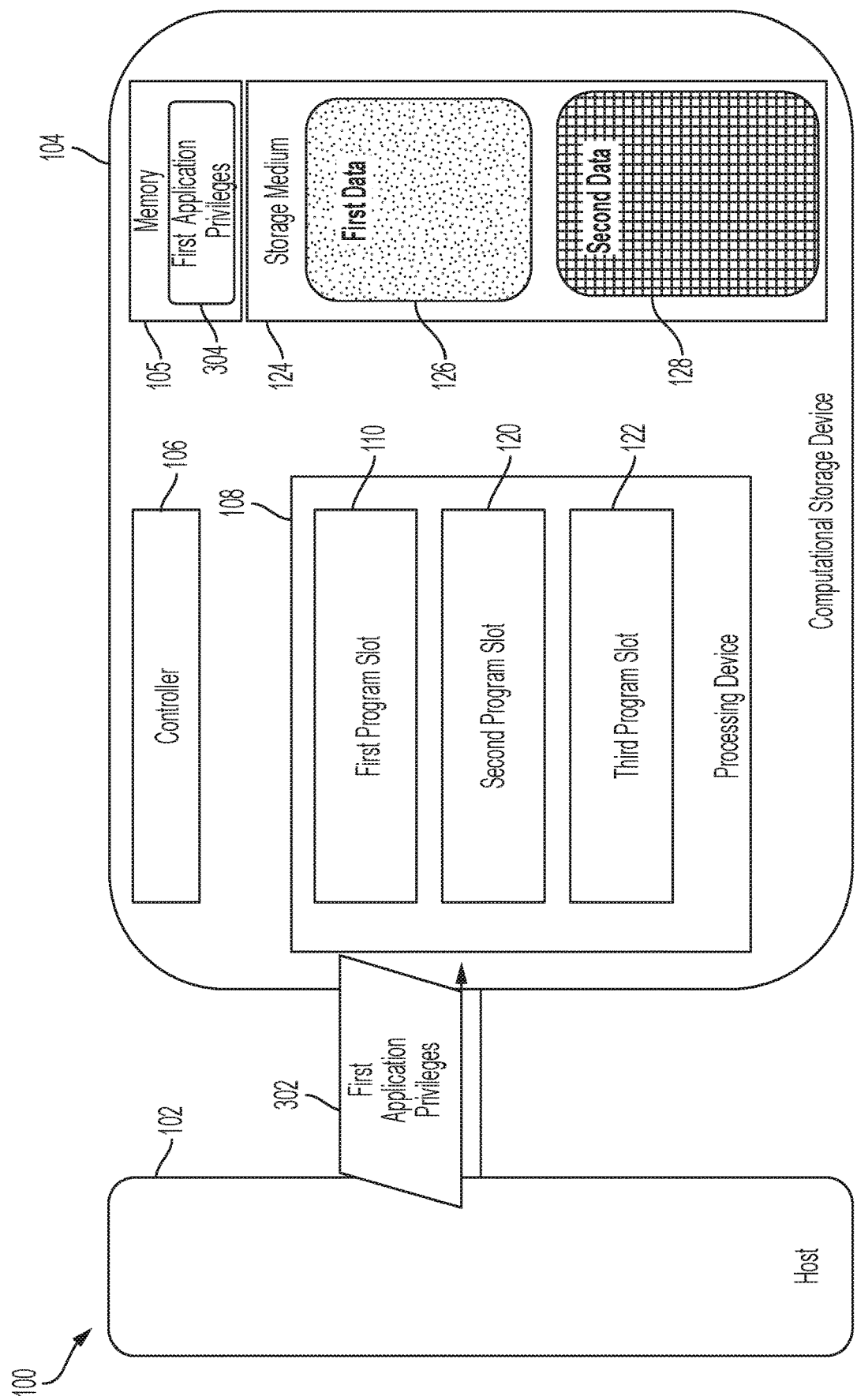
FIG. 3 depicts operations related to setting privileges associated with an application to be executed by a computational storage device in the system.

In addition to setting reservations and other metadata associated with program slots, the system 100 supports setting privileges associated with applications. FIG. 3 depicts an example in which the host 102 sets application privileges of an application. In the example of FIG. 3, the host 102 sends a command 302 to set application privileges for a first application. Based on the command 302, the controller 106 stores first application privileges 304 in the memory 105. The first application privileges 304 may indicate privileges of the first application and/or privileges of other entities with respect to the first application. Application privileges are described in more detail with respect to FIGS. 4-7 and 9.

While FIG. 3 depicts the command 302 originating from the host 102, other entities (e.g., an application executing on the processing device 108) may issue commands to set application privileges in some examples. In response to a command to set application privileges, such as the command 302, the controller 106 may determine whether an entity that sent the command has authority to set the application privileges. For example, the controller 106 may set privileges of an application in response to receiving a command from an entity with admin level privileges. As another example, the controller may set privileges of an application in response to receiving a command from an owner associated with the application. An owner of an application may be identified in metadata associated with the application stored in the memory 105 or in another location. In response to determining that an entity issuing a command to set application privileges is not authorized, the controller 106 may reject the command.

It should be noted that the controller 106 may store the first application privileges 304 in other locations than the memory 105. For example, the controller 106 may store the first application privileges 304 in the storage medium 124, in a memory internal to the processing device 108, in a memory internal to the controller 106, etc.

Figure 4A:
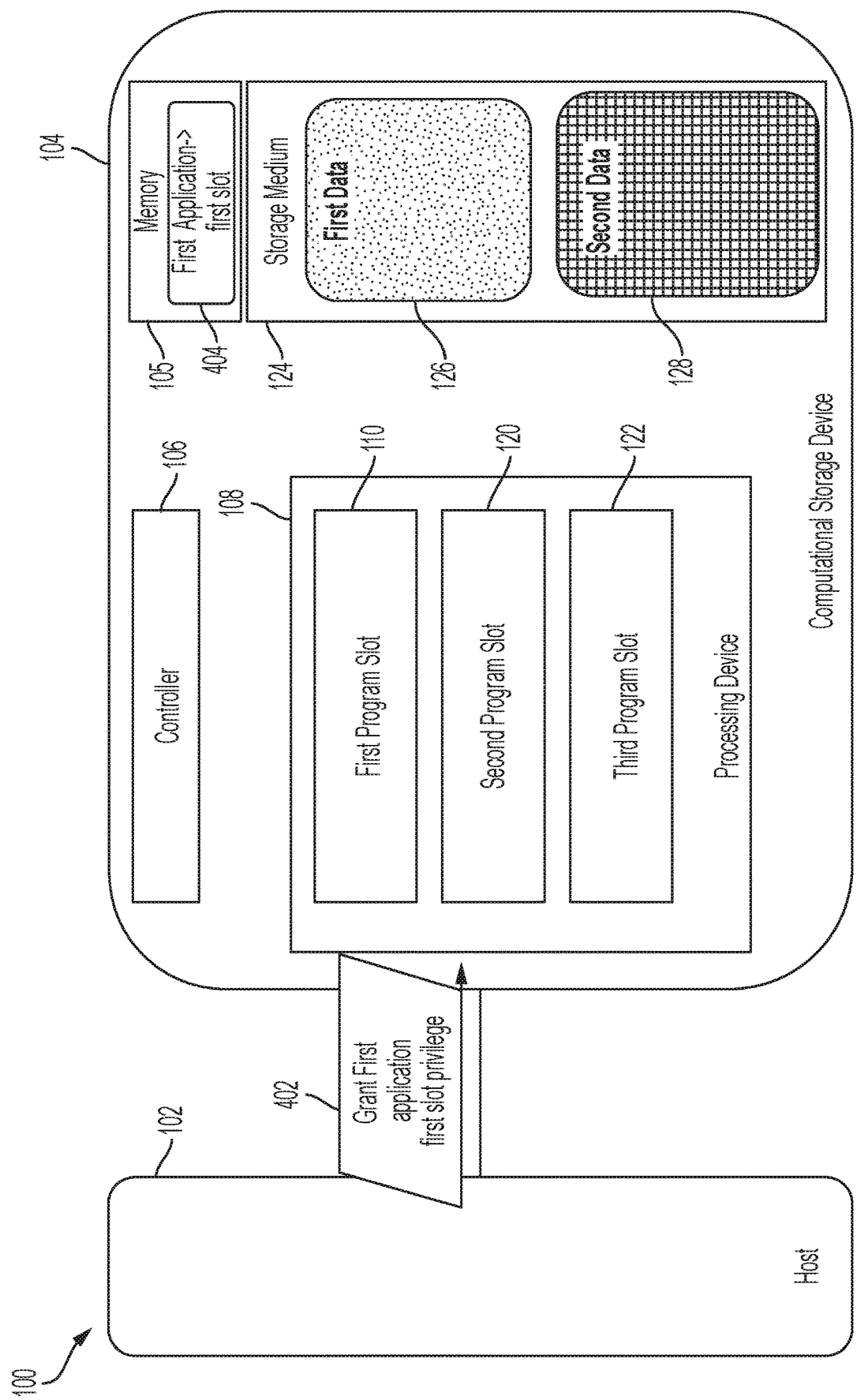
FIGS. 4A, 4B, and 4C are diagrams depicting various operations related to limiting an application to a designated slot.

FIG. 4A depicts an example in which the host 102 grants a first application a privilege to execute in the first program slot 110. In addition to reserving a slot to a specific application, the system 100 may support restricting an application to one or more specific slots. In the illustrated example, the host 102 sends a command 402 to grant a privilege to execute in the first program slot 110 to a first application 407 (shown in FIG. 4B). The command 402 may correspond to the command 302 of FIG. 3. In response to the command 402, the controller 106 may store an association 404 between the first application 407 and the first program slot 110. The association 404 may correspond to the first application privileges 304.

The controller 106 may selectively allow and disallow requests to load the first application 407 into program slots based on the association 404. For example, in FIG. 4B, the host 102 sends a request 406 to load the first application 407 into the first program slot 110. Based on the association 404 indicating that the first application 407 is permitted to execute in the first program slot 110, the controller 106 may load the first application 407 into the first program slot 110. FIG. 4C illustrates another example in which the host 102 sends a request 408 to load the first application 407 into the second program slot 120. In response to determining that the association 404 does not grant the first application 407 access to the second program slot 120, the controller 106 rejects the request 408. Rejecting the request 408 may include declining to load the first application 407 into the second program slot 120 and sending a rejection 410 to the host 102.

As described above, the command 402 may originate from an entity other than the host 102 in other examples. Further, the controller 106 may selectively store the association 404 based on a privilege of the entity to update privileges associated with the first application 407, as described above. Additionally, the request 406 to load the first application 407 may originate from an entity other than the host 102. The controller 106 may selectively process the request 406 based on a privilege of the entity to load the first application 407.

Figure 4B:
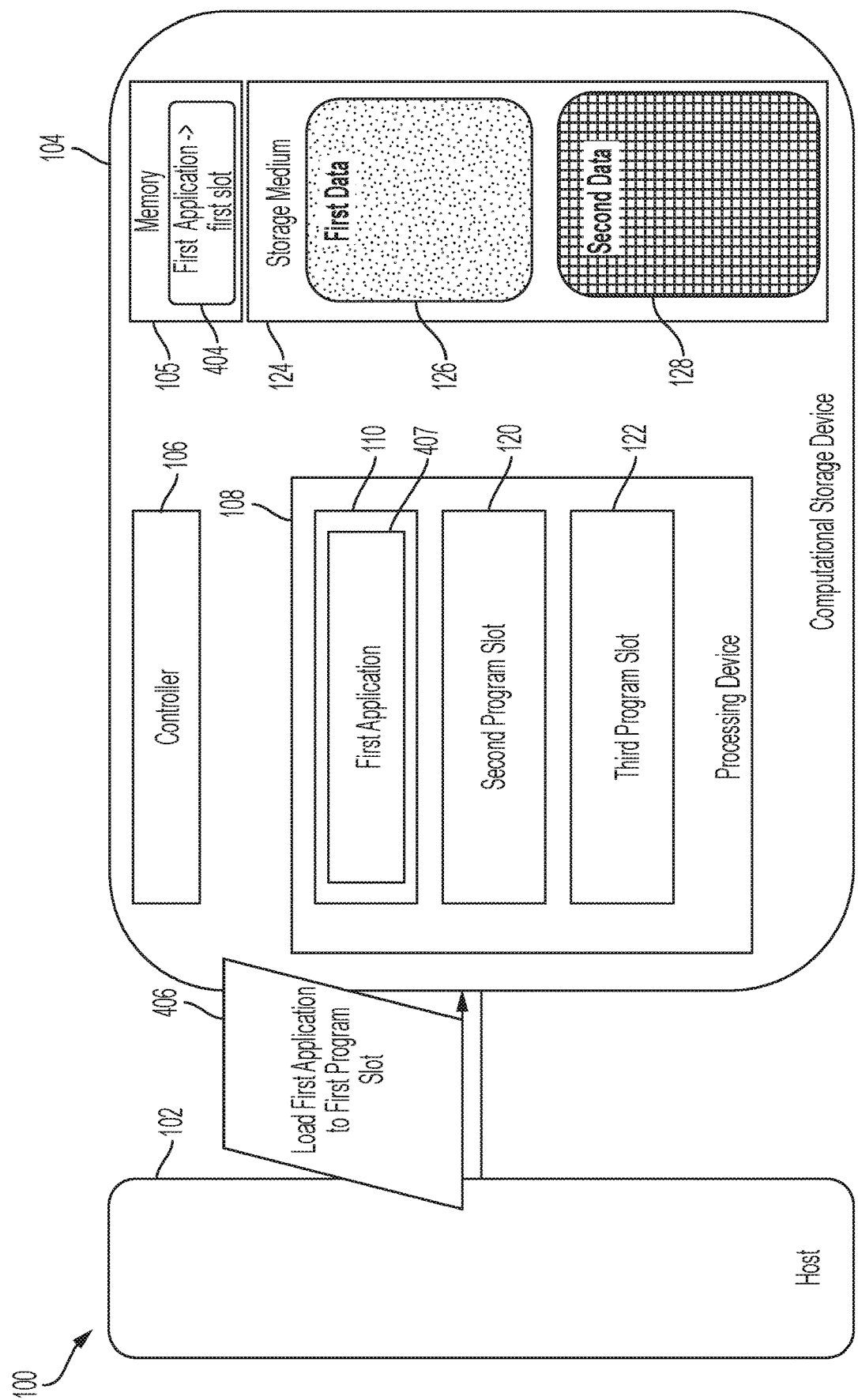
Figure 4C:
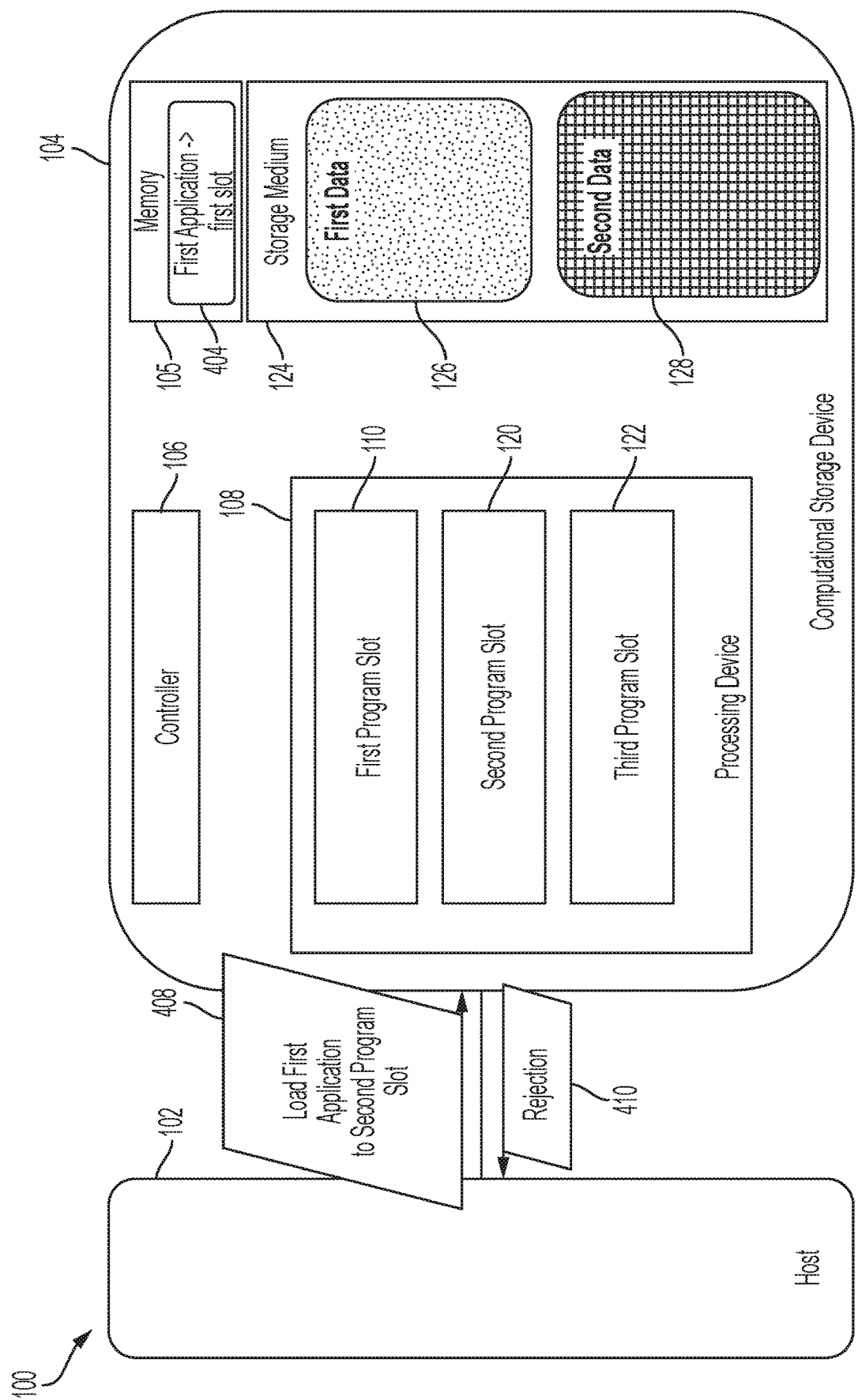

Thus, FIGS. 4A-C illustrate that the system 100 supports restricting an application to designated program slots. Accordingly, a particular program may not be loaded into more than a desired number of slots and program slot resources may be protected.

Figure 5A:
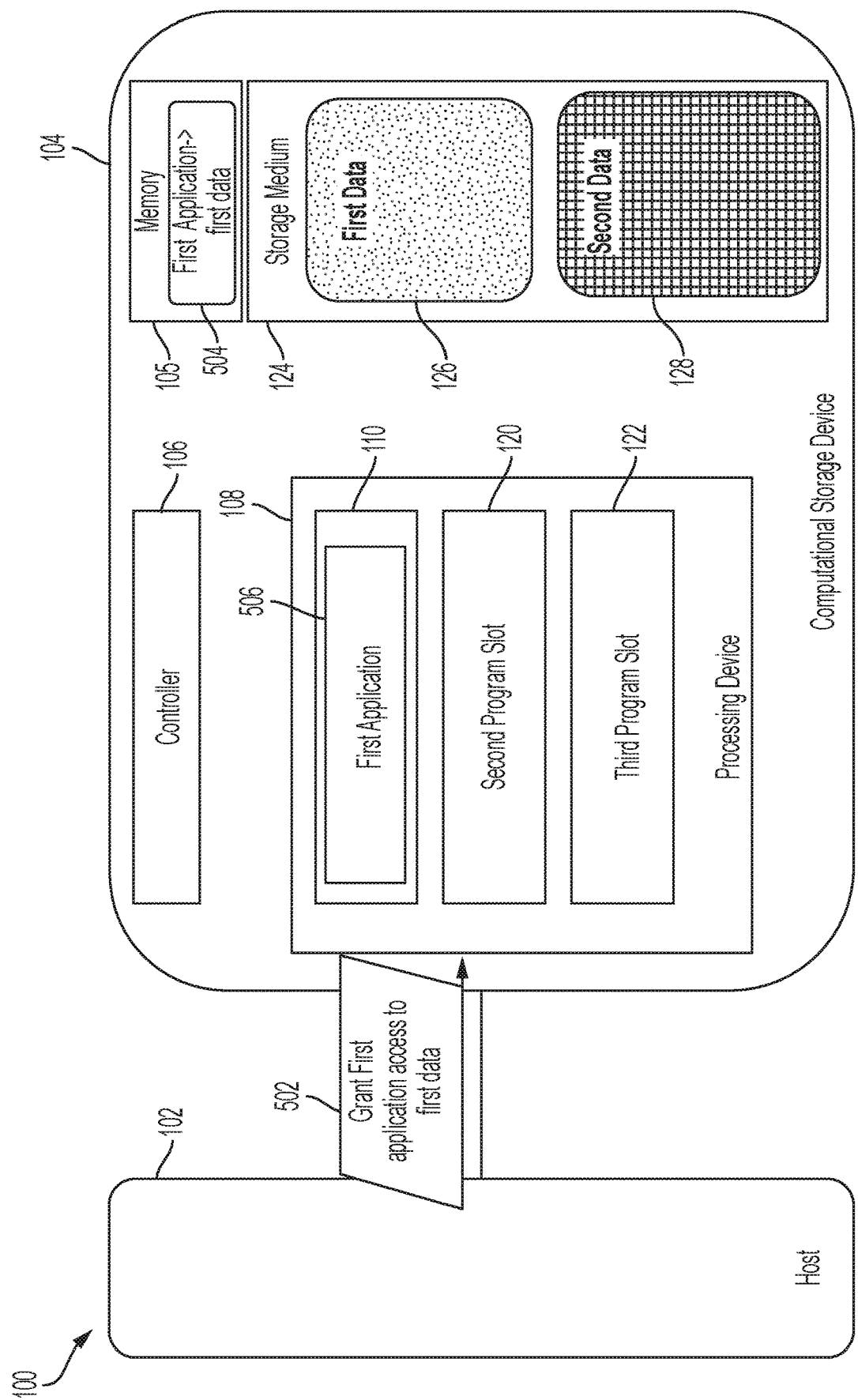
FIGS. 5A, 5B, and 5C are diagrams depicting operations related to securing data in a storage medium accessible to applications executed by the computational storage device in the system.
Figure 5B:
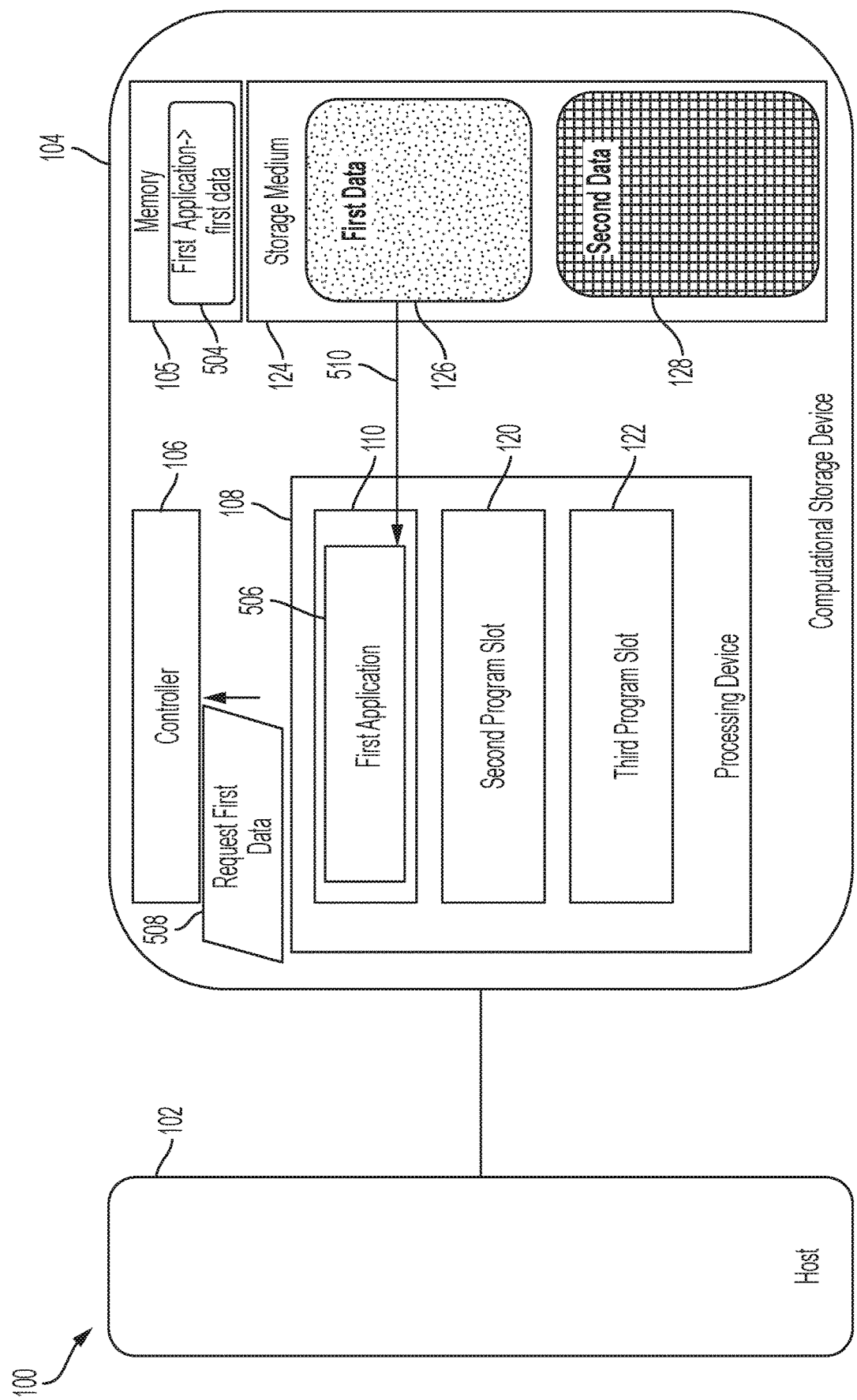
Figure 5C:
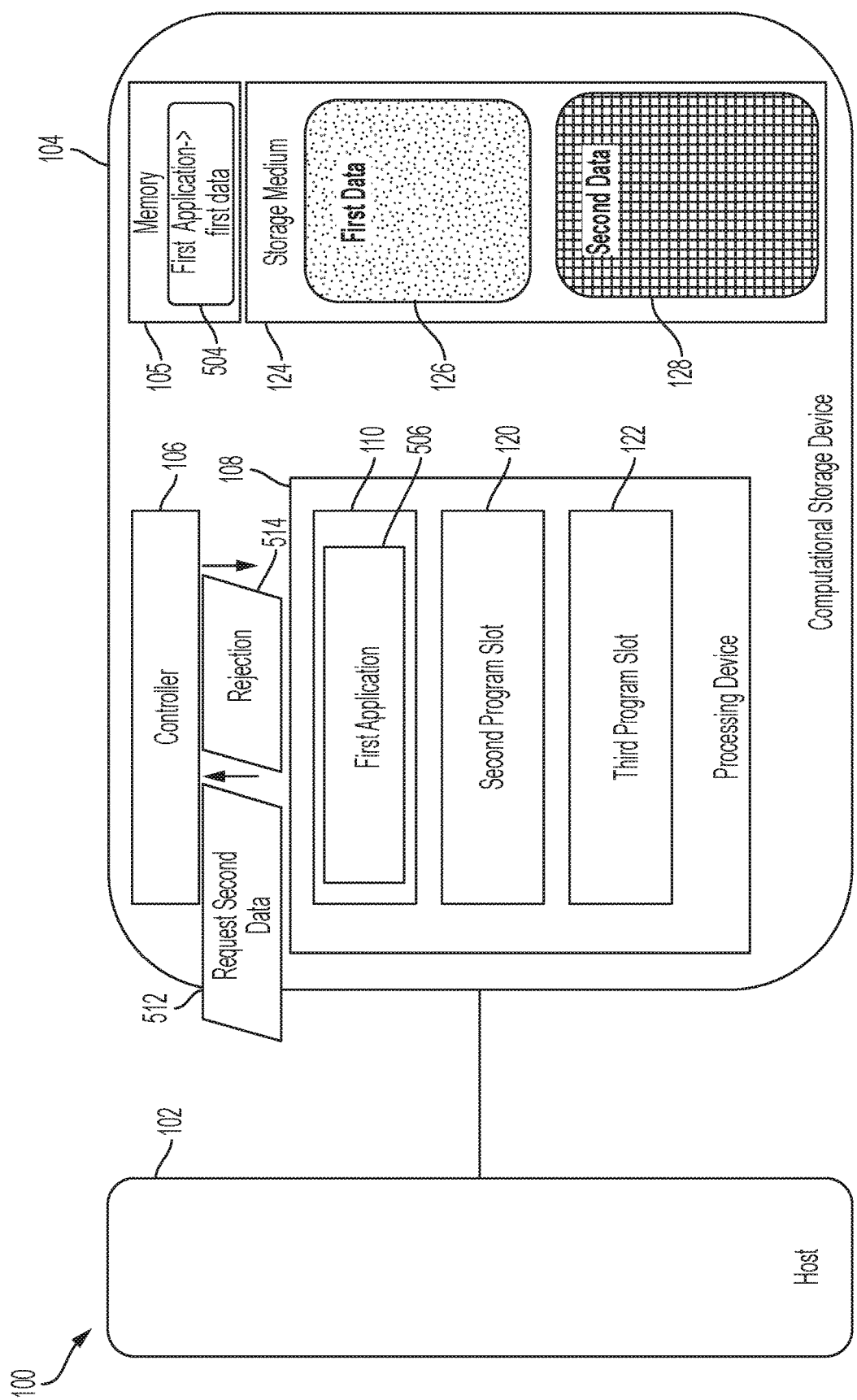

In addition to restricting an application to one or more defined program slots, the system 100 may support limiting an application's ability to access data stored on the storage medium 124. FIGS. 5A-C depict illustrative examples in which the system 100 limits access to the storage medium 124.

In the example illustrated in FIG. 5A, the host 102 sends a command 502 to grant a first application 506 access to the first data 126 on the storage medium 124. The command 502 may correspond to the command 302. The command 502 may include an identifier of a namespace, a location (e.g., LBA, LBA range, etc.), a page, a key, some other identifier associated with the first data 126, or a combination thereof. In addition, the command may include an access type identifier (e.g., read access, write access, or execute access).

In response to the command 502, the controller 106 stores an association 504 between the first application 506 and the first data 126 in the memory 105 in the illustrated example. In other examples, the association 504 may be stored in another location in addition or in alternative to the memory 105. For example, the association 504 may be stored in a memory of the processing device 108, a memory of the controller 106, in the storage medium 124, etc. The association 504 may correspond to or be included in the first application privileges 304. While issued by the host 102 in the illustrated example, the command 502 may be issued by another entity in other examples (e.g., another application executing on the processing device 108). In some implementations, the controller 106 may selectively process the command 502 based on a permission level associated with the entity that issues the command 502. The association 504 may also include an access type.

In FIG. 5B, the first application 506 executing in the first program slot 110 sends a request 508 for the first data 126. In response to the association 504 stored in the memory 105 indicating the first application 506 has access to the first data 126, the controller 106 initiates transfer of the first data 126 to the first application 506 as shown by arrow 510. It should be noted that while FIG. 5B depicts the first application 506 reading the first data 126, the first application 506 may also send a request to write to the first data 126. The controller 106 may similarly initiate the write to the first data 126 in response to determining that the association 504 indicates that the first application 506 has access to the first data 126.

However, in some implementations, the association 504 may indicate a particular type of access that is granted to the first application 506. For example, the association 504 may indicate that the first application 506 has read access, write access, execute access, or a combination thereof to the first data 126. The controller 106 may deny requests to access to data in cases in which an application is not allowed to access the data (e.g., there is no association between the application and the data) or in cases in which a type of the access is not granted to the application for the data. FIG. 5C depicts an example in which the first application 506 attempts to access data that is not granted to the first application 506.

In the example of FIG. 5C, the first application 506 issues a request 512 for the second data 128. In response to the first application 506 lacking authority to access the second data 128, the controller 106 denies access to the second data 128. In the illustrated example, the controller 106 issues a rejection message 514 to the first application 506. In other implementations, the controller 106 may not send the rejection message 514 and may simply ignore the request 512. The controller 106 may determine that the first application 506 lacks authority to access the second data 128 by confirming that permissions granted to the first application 506 (e.g., the association 504) do not include permission to access the second data 128. Alternatively, the controller 106 may determine that the first application 506 lacks authority to a specific type of access to the second data 128. For example, the memory 105 may store an association indicating that the first application 506 has read access to the second data 128, but the request 512 may be for write access to the second data 128. Accordingly, the controller 106 may determine that the first application 506 lacks authority to perform the requested access type.

Thus, FIGS. 5A-5C depict that the system 100 may secure data in a computational storage device by limiting application access to specific data, specific access types, or a combination thereof.

Figure 6A:
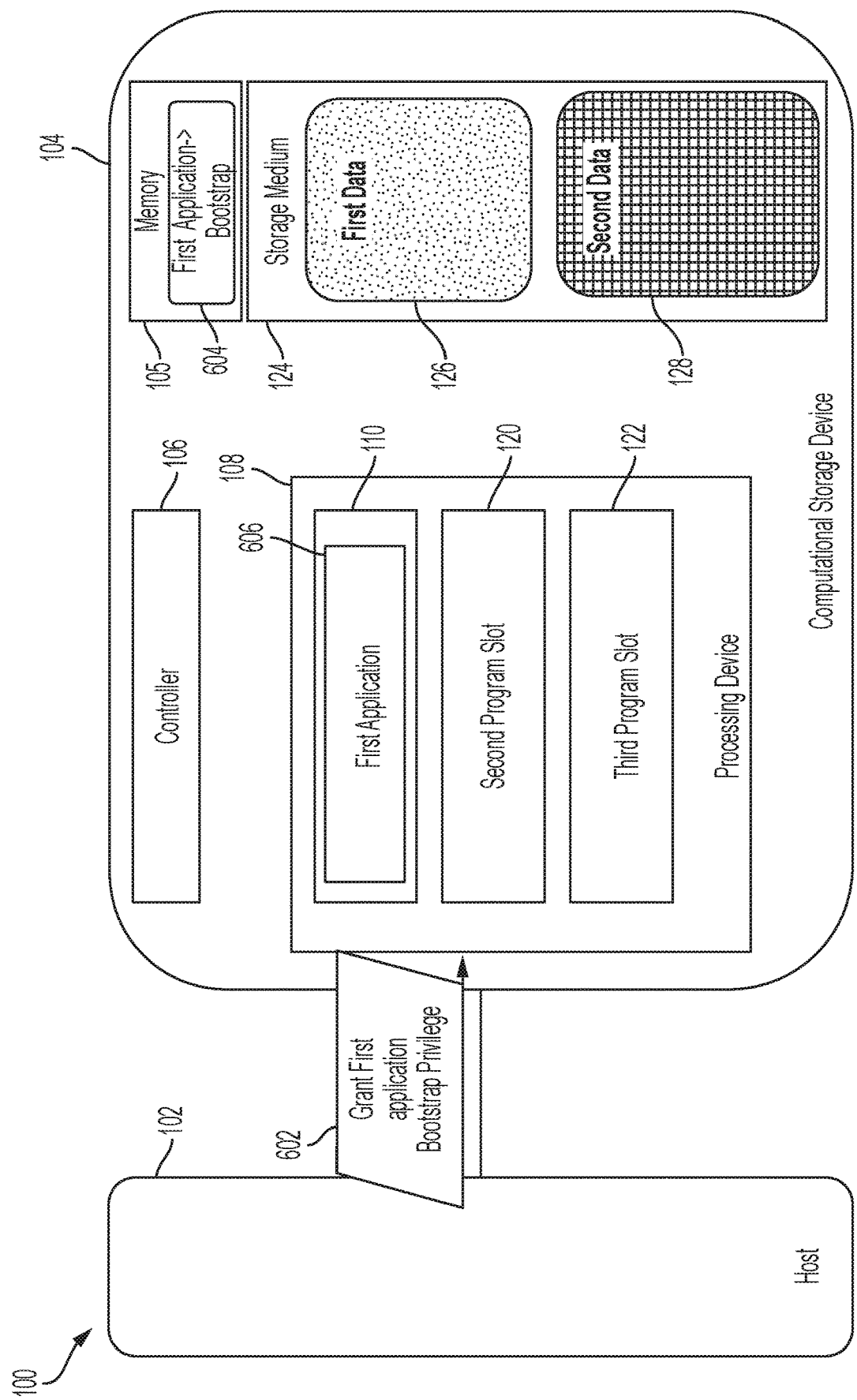
FIGS. 6A, 6B, and 6C are diagrams depicting operations related to one application bootstrapping another application.

The system 100 may further support granting one application the ability to load and/or execute other applications. One application loading and/or executing another application may be referred to as bootstrapping. FIG. 6A depicts an example in which a first application 606 is granted a bootstrap privilege. In the example of FIG. 6A, the host 102 sends a command 602 to the computational storage device 104. The command 602 may correspond to the command 302. The command 602 indicates that the first application 606 is to be granted a bootstrap privilege. The controller 106 stores an association 604 between the first application and the bootstrap privilege in the memory 105. It should be noted that another entity (e.g., another application executing on the processing device 108) may issue the command 602 in other examples. In some implementations, the controller 106 may selectively process the command 602 (e.g., store the association 604) based on an authority level of the entity issuing the command 602. Further, the controller 106 may store the association 604 in locations other than the memory 105. For example, the controller 106 may store the association 604 in a memory of the controller 106, a memory of the processing device 108, in the storage medium 124, in another location, or in a combination thereof. The association 604 may correspond to or be included in the first application privileges 304.

The controller 106 may selectively grant a request by the first application 606 to load another program into one of the program slots based on whether the first application is associated with the bootstrap privilege generally. In some examples, the command 602 and the association 604 indicate one or more specific applications that may be bootstrapped by the first application 606. Accordingly, the controller 106 may selectively grant requests by the first application 606 to load another application into another program slot based on whether the first application 606 is associated with the privilege to bootstrap the other application specifically.

Figure 6B:
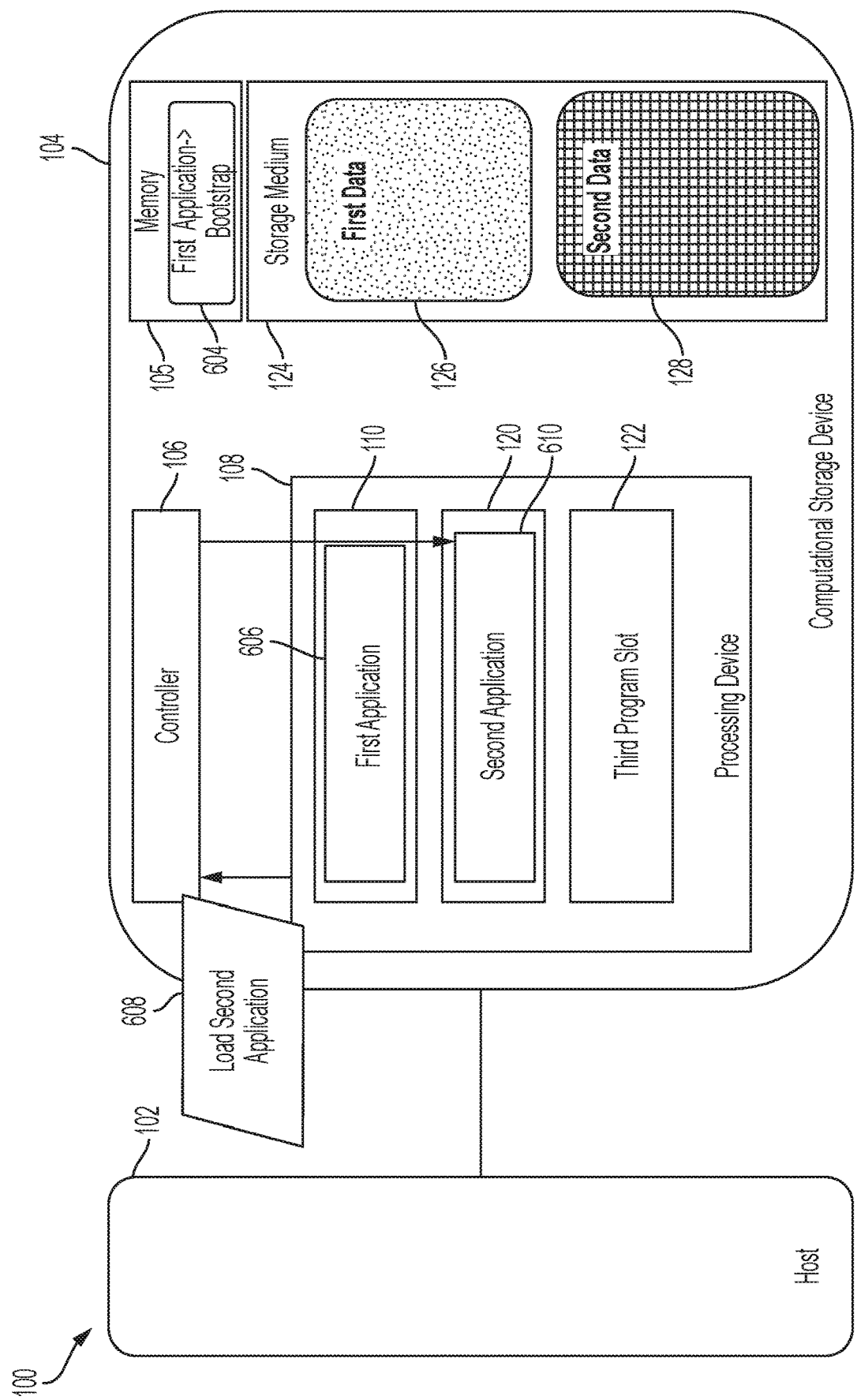

FIG. 6B depicts an example in which the first application 606 successfully bootstraps another application. In the illustrated example, the first application 606 sends a request 608 to load a second application 610 into the second program slot 120. In response to determining that the association 604 grants the first application 606 the privilege to bootstrap the second application 610, the controller 106 loads the second application 610 into the second program slot 120. Loading the second application 610 may include downloading the second application 610 and/or retrieving the second application 610 from the storage medium 124. In a particular example, the first application 606 may correspond to a checksum application and the second application 610 may correspond to a repair program. In response to determining that a calculated checksum for particular data does not match a stored checksum, the checksum application may send a request to the controller 106 to load the repair application. The controller 106 may selectively grant the request based on whether the checksum application has the bootstrap privilege, as indicated by the association 604.

Thus, FIGS. 6A-6B illustrate that the system 100 supports applications executing at the computational storage device 104 loading and executing other applications. The controller 106 of the computational storage device 104 selectively grants such requests from applications based on a bootstrap privilege. Accordingly, complicated workflows may be supported such as a diagnostic program executing in the processing device 108 loading and executing another program to remediate a detected error. Further, because the controller 106 selectively grants bootstrapping requests based on privileges, unauthorized applications may be prevented from loading other applications. Further, because a bootstrapping privilege may be limited to specific applications, an application may be limited to loading/executing specific other applications.

Figure 6C:
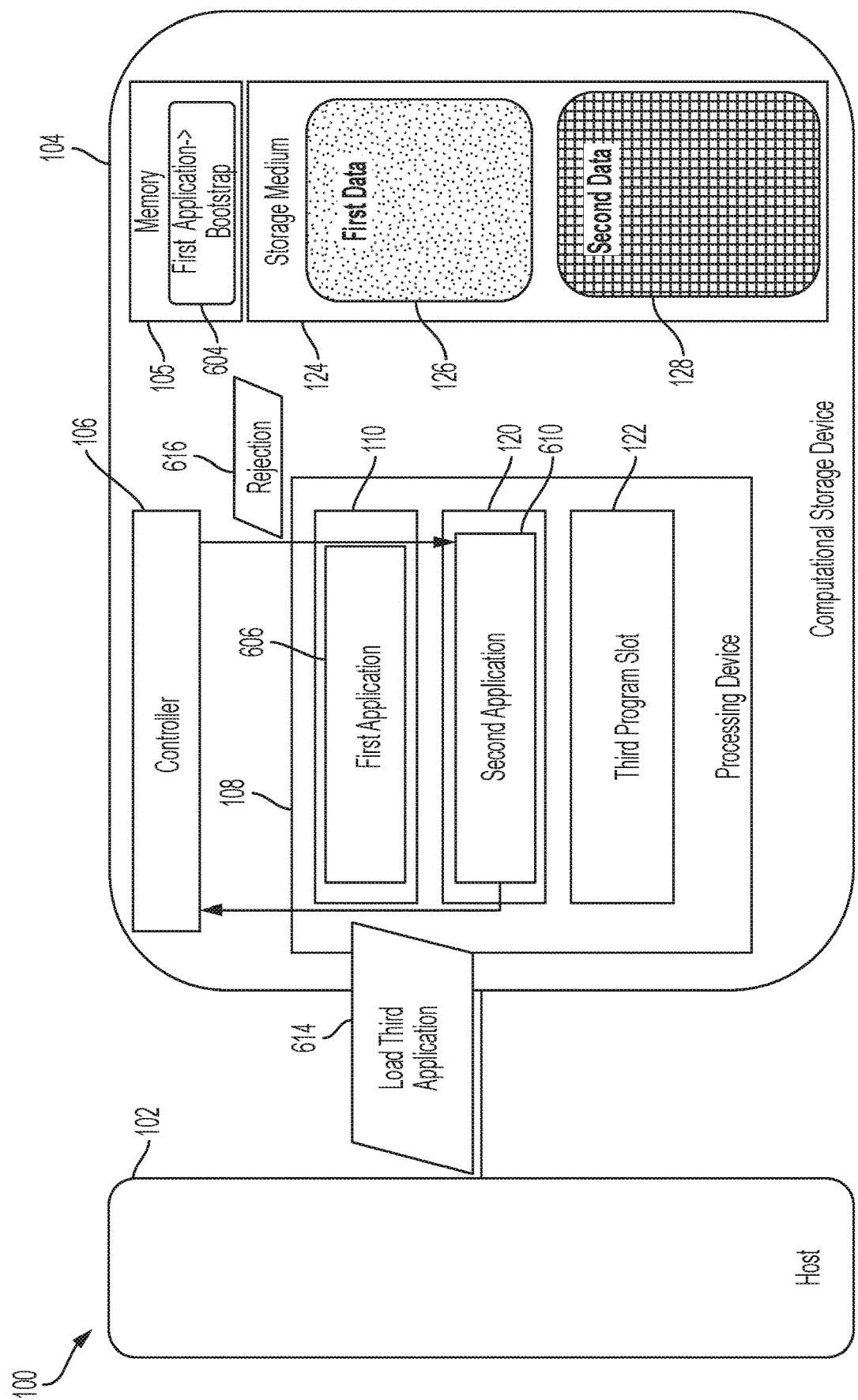

The controller 106 may reject bootstrap requests from applications that lack the bootstrap privilege. FIG. 6C depicts an example in which the second application 610 sends a request 614 to load a third application to the controller 106. In response to determining that the memory 105 lacks an association between the second application 610 and the bootstrap privilege the controller 106 may reject the request 614. Alternatively, the controller 106 may determine that the second application 610 lacks the bootstrap privilege based on a determination that the memory 105 stores an indicator indicating that the second application 610 is disallowed the bootstrap privilege. In the illustrated example, the controller 106 sends a rejection message 616 to the second application 610 in response to determining that the second application 610 lacks the bootstrap privilege.

Figure 7:
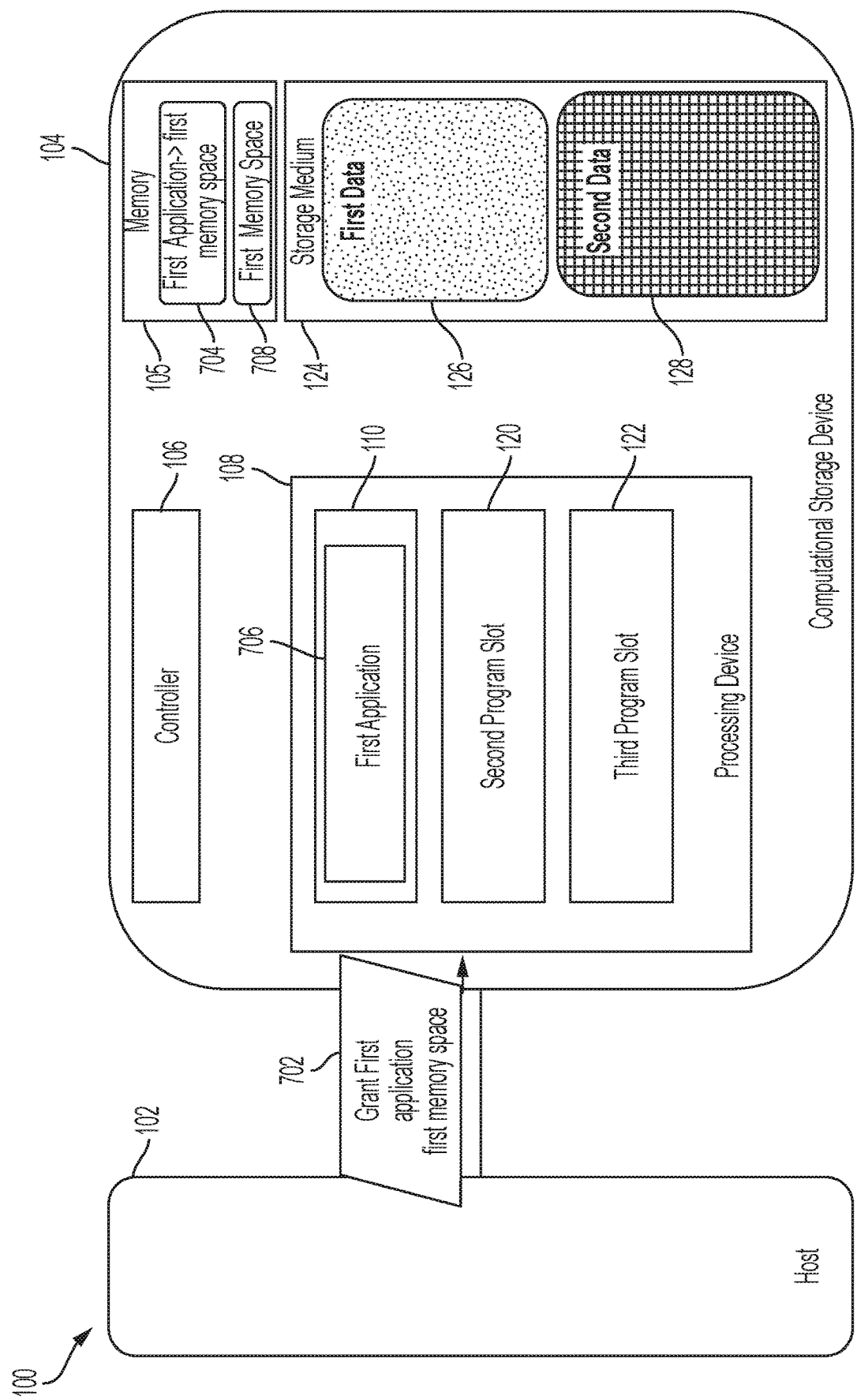
FIG. 7 is a diagram illustrating operations related to granting an application executing in a computational storage device access to a memory space associated with a memory of the computational storage device.

The system 100 may also support limiting access to the memory 105 by applications. FIG. 7 illustrates an example in which a first application 706 is granted access to a portion of the memory 105. In the illustrated example, the host 102 sends a command 702 to grant a first application 706 access to a first memory space 708. The first memory space 708 may correspond to a virtual memory space mapped to physical addresses in the memory 105. In some implementations, the controller 106 allocates the first memory space 708 in response to the command 702. In the illustrated example, the controller 106 stores an association 704 between the first application 706 and the first memory space 708 in the memory 105.

The controller 106 may maintain a data structure (such as a page table) for each memory space. In some implementations, the association 704 includes a data structure (e.g., page table) for the first memory space 708. As described further herein, associations between the application and privileges may be passed to an application by the controller 106 during a process of loading the application into a program slot. These associations (e.g., the first application privileges 304, the association 404, the association 504, the association 604, etc.) may include a data structure (e.g., a page table).

The association 704 indicates that the first application 706 is permitted to access the first memory space 708. In some implementations this access may be limited based on type. For example, the command 702 and the association 704 may designate that the first application 706 has a particular type of access (e.g., read access, write access, execute access) to the first memory space 708. Based on the association 704, the controller 106 may selectively pass memory access requests from the first application 706 to the memory 105.

The command 702 may correspond to the command 302 and the association 704 may correspond to or be included in the first application privileges 304. While the command 702 is shown as originating from the host 102, in other examples, the command 702 may originate from another entity (e.g., an application executing on the processing device 108). The controller 106 may selectively store the association 704 based on an authority level associated with the entity that issued the command 702.

While the association 704 is shown stored in the memory 105, it should be noted that the association 704 may be stored in other locations. For example, the controller 106 may store the association 704 in a memory of the controller 106, a memory of the processing device 108, in the storage medium 124, another location, or a combination thereof.

While the command 702 grants a memory space to an application executing on the processing device 108, it should be noted that the controller 106 may also store an association between the host 102 and a memory space of the memory 105. The system 100 may support partitioning of the memory 105 into memory spaces accessible to applications running on the processing device 108 (but not the host 102), memory spaces accessible to the host 102 (but not applications executable by the processing device 108), memory spaces accessible to both the host 102 and applications running on the processing device 108, or a combination thereof.

The controller 106 may selectively grant requests to access the memory 105 based on stored associations between entities and memory spaces, access types, or a combination thereof. For example, the controller 106 may grant the first application 706 a request to access the first memory space 708 based on the association 704. Granting a request to the memory 105 may include generating a translated request by translating an address in the request (e.g., based on a stored page table or other data structure) to an address of the memory 105 and forwarding the translated request to the memory 105.

Figure 8:
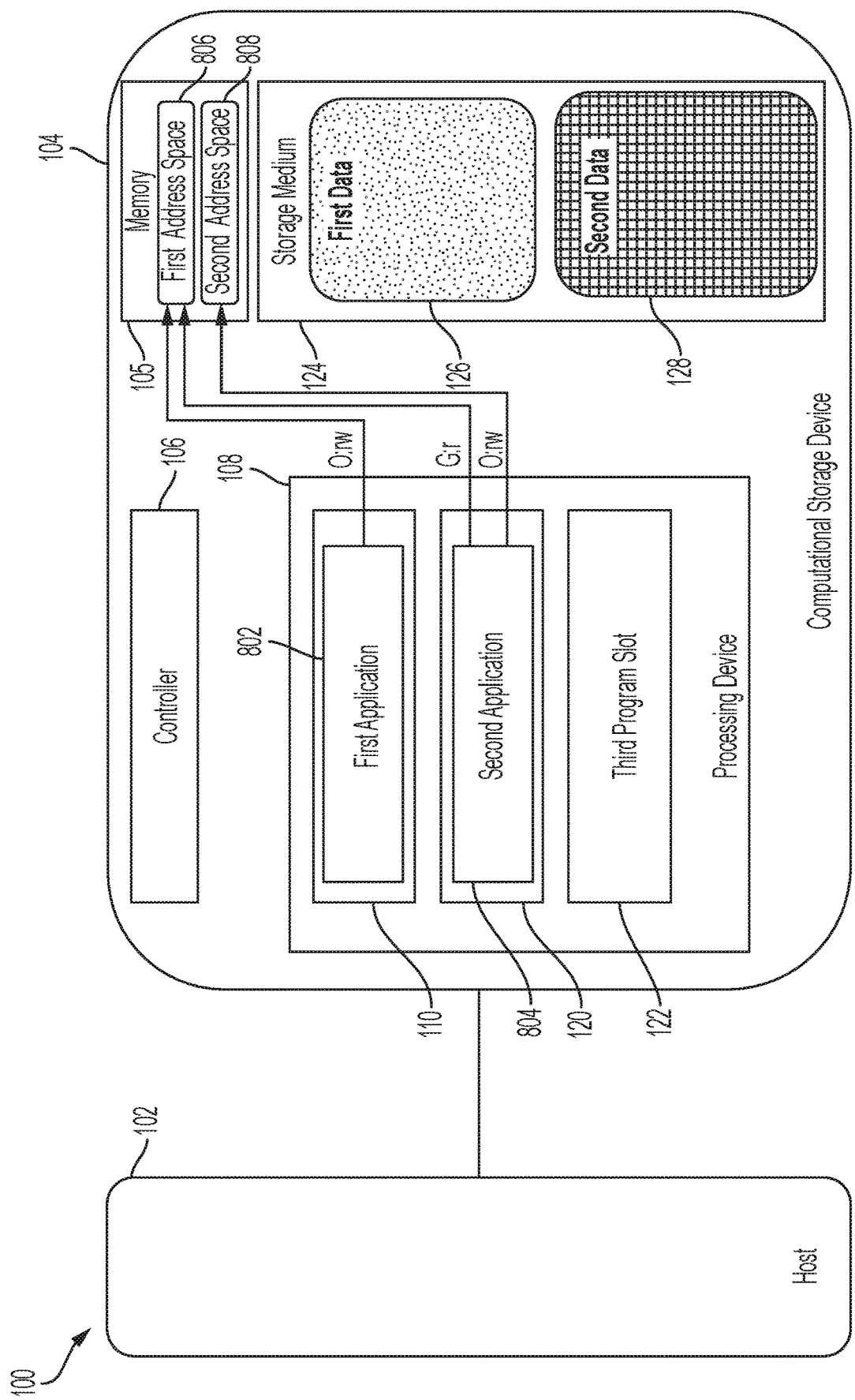
FIG. 8 is a diagram depicting various applications that have access rights to different memory spaces in the memory.

FIG. 8 graphically illustrates associations between applications and memory address spaces in the memory 105. In the illustrated example, a first application 802 is associated with an owner read write privilege for a first address space 806. Thus, the controller 106 may grant read and write requests directed to the first address space 806 from the first application 802. A second application 804 is associated with a group read privilege for the first address space 806. Accordingly, the controller 106 may grant read requests directed to the first address space 806 from the second application 804. The second application 804 is further associated with an owner read write privilege for a second address space 808. Thus, the controller 106 may grant read and write requests directed to the second address space 808 from the second application 804.

However, the controller 106 may deny a write request from the second application 804 directed to the first address space 806 in response to determining that the second application 804 is granted read access but not write access to the first address space 806. Similarly, the controller 106 may deny requests to access the second address space 808 from the first application 802. Further, the first application 802 may lack page information associated with the second address space 808.

Accordingly, the system 100 supports secure management of memory address spaces accessible to applications in a computational storage device. This may be particular beneficial in multi-tenant environments in which one tenant's data should be kept private from another tenant's application.

Figure 9:
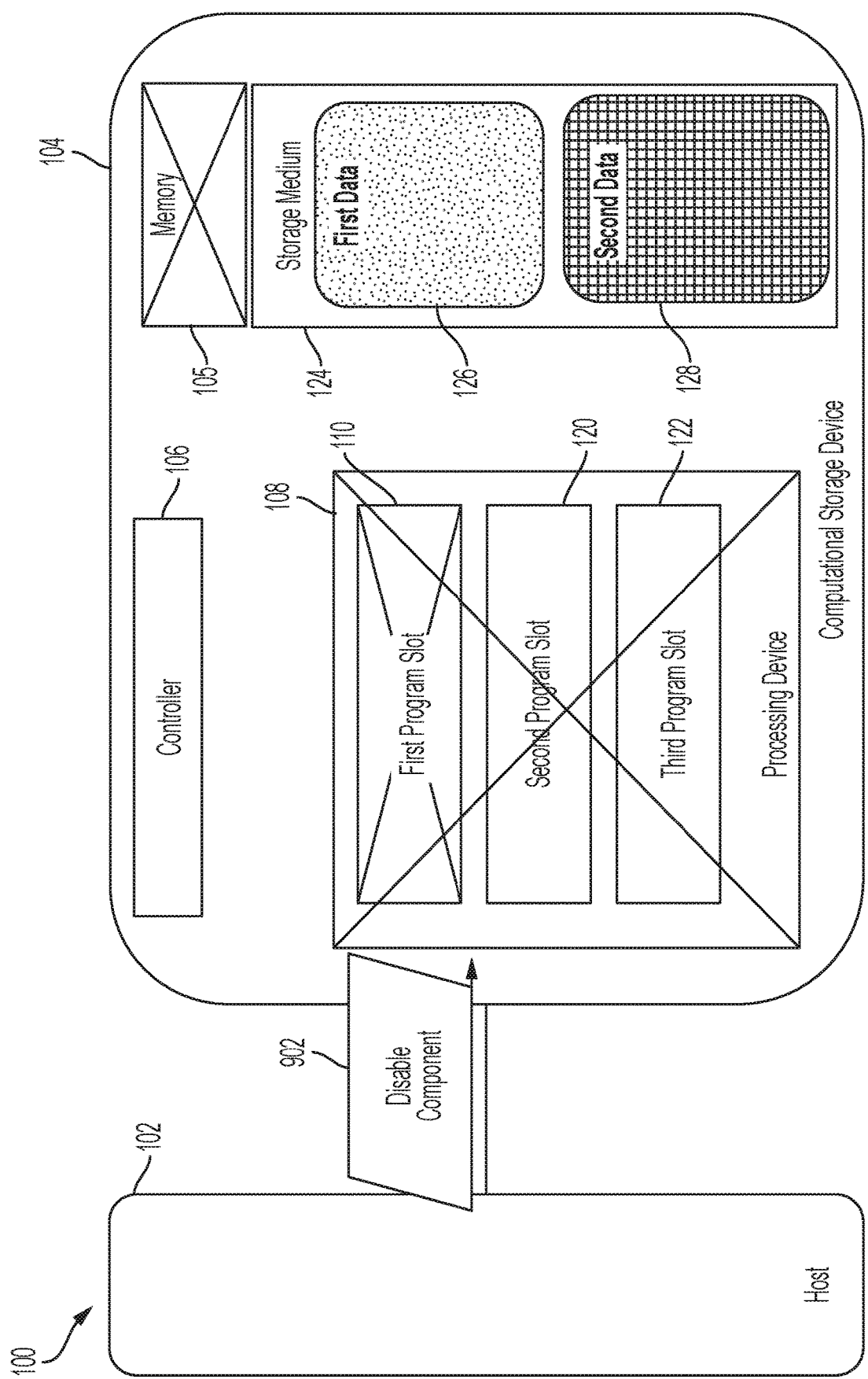
FIG. 9 is a diagram depicting operations related to disabling components of the system.

FIG. 9 illustrates that the system 100 supports disabling of components of the computational storage device 104 in response to commands. The controller 106 may not grant access to a disabled component. In the illustrated example, the host 102 sends a command 902 to disable the processing device 108 and the memory 105. Based on the command 902, the controller 106 disables the processing device 108 (including the program slots 110, 120, 122) and the memory 105. The controller 106 may support disabling of any combination of components of the computational storage device 104, including individual program slots of the processing device 108, individual memory spaces in the memory 105, and individual portions (e.g., namespaces, locations, pages, etc.) in the storage medium 124. Disabling a component may be useful in various situations, such as during maintenance or during an error recovery operation. The controller 106 may clear any applications loaded into disabled program slots. Clearing an application from a program slot may include signaling the processing device 108 to stop executing the application, deleting an entry in data associated with the slot, or a combination thereof.

While illustrated as originating from the host 102, the command 902 may originate from a different entity in other examples. The controller 106 may selectively process the command 902 based on an authority level associated with the entity issuing the command 902. For example, the controller 106 may disable the processing device 108 and the memory 105 based on the command 902 in response to determining that the host 102 has an admin authority level.

It should be noted that the operations described above may be combined. For example, the controller 106 may determine whether to grant a request from a first application to load a second application into the second program slot 120 based on a combination of A whether the first application has a corresponding bootstrap privilege, B whether the second program slot 120 is reserved to another application, and C whether the second application is limited to a particular slot. Other combinations of permissions described above may be used by the controller to determine whether to grant a given request. Thus, the controller 106 may enforce a variety of rules in combination to provide a secure computational storage device.

Figure 10:
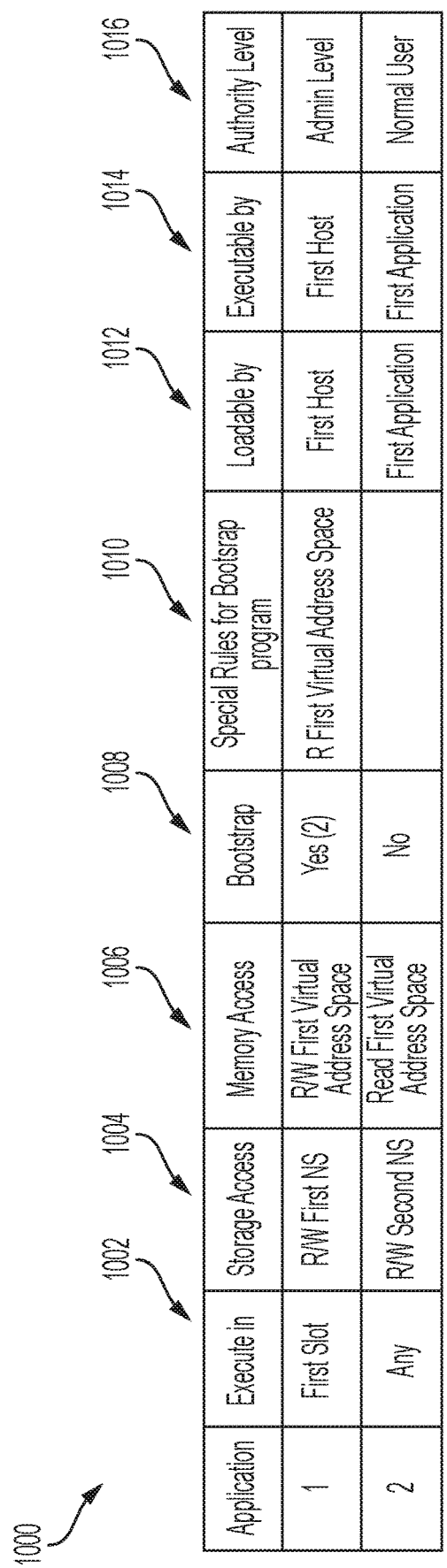
FIG. 10 is a diagram of a data structure that stores rights and privileges associated with applications.

Referring to FIG. 10, a table 1000 showing examples of privileges (e.g., the first application privileges 304) associated with an application is shown. In the illustrated example, the table indicates what an application may execute in in first field 1002. The first field 1002 may correspond to the association 404 of FIG. 4. A controller (e.g., the controller 106) may limit execution of an application to specific slots based on content of the corresponding first field 1002. In the illustrated example, a first application is limited to a first slot based on the first field 1002. Accordingly, a controller 106 may grant a request to load the first application into the first slot (assuming all other conditions are met) but deny requests to load the first application into other slots. In contrast, the first field 1002 for a second application shown in the table 1000 indicates that the second application may be loaded into any slot. Accordingly, a controller may grant a request to load the second application into a program slot without considering which slot is requested.

The table 1000 further includes a second field 1004 that defines what storage space (e.g., in the storage medium 124) a corresponding application has access to. In the illustrated example, the second field 1004 indicates that the first application has read and write access to a first namespace. Accordingly, a controller may grant read and write requests from the first application directed to the first namespace. However, the controller may disallow requests from the first application to access other namespaces. Similarly, the second field 1004 indicates that the second application has read and write access to a second namespace. The second field 1004 may correspond to the association 504.

The table 1000 further includes a third field 1006 that defines what memory space (e.g., in the memory 105) a corresponding application has access to. In the illustrated example, the third field 1006 indicates that the first application has read and write access to a first virtual address space. Accordingly, a controller may grant read and write requests from the first application directed to the first virtual address space. However, the controller may disallow requests from the first application to access other virtual address spaces. The third field 1006 may include an index to, or other indicator of, a data structure (e.g., a page table) for each virtual address space identified by the third field 1006. The third field 1006 further indicates that the second application has read access to the first virtual address space. The third field 1006 may correspond to the association 704.

The table 1000 further includes a fourth field 1008 that defines whether a corresponding application has a bootstrap privilege. In the illustrated example, the fourth field 1008 indicates that the first application has a privilege to bootstrap the second application (designated by a 2 in parenthesis). Accordingly, a controller may grant a request from the first application to load the second application. However, the controller may disallow requests from the first application to load other applications. The bootstrap privilege may not be limited to a specific target application in all examples. The fourth field 1008 further indicates that the second application does not have a bootstrap privilege. The fourth field 1008 may correspond to the association 604.

The table 1000 further includes a fifth field 1010 that defines special rules that apply for applications bootstrapped by the corresponding application. In the illustrated example, the fifth field 1010 indicates that applications bootstrapped by the first application gain read access to the first virtual address space. Accordingly, a controller that grants a request from the first application to bootstrap another application may grant read access to the first virtual address space. In some implementations, the fifth field 1010 may designate a set or subset of privileges of the corresponding application that are to be inherited by a bootstrapped application. That is, the fifth field 1010 may indicate one or more second privileges of the bootstrapped application. The fifth field 1010 may correspond to a field in the first application privileges 304.

The table 1000 further includes a sixth field 1012 that defines what entity may load a corresponding application. In the illustrated example, the sixth field 1012 indicates that the first application may be loaded by a first host. Accordingly, a controller may grant requests by the first host to load the first application, but deny requests from other entities to load the first application. Similarly, the sixth field 1012 indicates that the second application may be loaded by the first application. The sixth field 1012 may correspond to a field in the first application privileges 304.

The table 1000 further includes a seventh field 1014 that defines what entity may execute a corresponding application. In the illustrated example, the seventh field 1014 indicates that the first application may be executed by a first host. Accordingly, a controller may grant requests by the first host to execute the first application, but deny requests from other entities to execute the first application. Similarly, the seventh field 1014 indicates that the second application may be executed by the first application. The seventh field 1014 may correspond to a field in the first application privileges 304.

The table 1000 further includes an eighth field 1016 that defines what authority level a corresponding application has. In the illustrated example, the eighth field 1016 indicates that the first application has an admin level authority level. Accordingly, a controller may grant requests from the first application that are associated with an authority level satisfied by the admin level. Similarly, the eighth field 1016 indicates that the second application has a normal user authority level. Accordingly, a controller may grant requests from the second application that are associated with an authority level satisfied by the normal user level. While 2 authority levels are illustrated, embodiments according to this disclosure are not limited to 2 authority levels. The eighth field 1016 may correspond to a field in the first application privileges 304.

Thus, FIG. 10 illustrates various right and privileges that may be associated with applications. These rights and privileges may be stored in a memory (e.g., the memory 105 or other location) by a controller (e.g., by the controller 106) in response to one or more commands (e.g., the command 302, the command 402, the command 502, the command 602, the command 702, or a combination thereof) from one or more entities (e.g., the host 102, an application executing on the processing device 108, or a combination thereof). The controller 106 may selectively update the rights and privileges based on a command in response to determining that the entity issuing the command has a designated authority level. For example, the controller 106 may update the rights and privileges based on commands from entities with admin level authority but not from other entities. While a table is shown, it should be noted that privileges may be stored in other data structures. Further, privileges may include more or fewer fields than illustrated in FIG. 10 in various examples. In addition, the disclosure is not limited to the applications shown. Other examples according to the disclosure include a different number of applications. Further, data shown in the table 1000 may be stored in more than one data structure in some examples.

FIG. 11 is a diagram 1100 showing information associated with program slots. The diagram 1100 includes rows for slots that are available in a processing device (e.g., the processing device 108). Each row has several fields that indicate attributes of the corresponding slot. In the illustrated example, the diagram 1100 includes a first field 1102 that indicates whether a corresponding slot is reserved (and to what application the slot is reserved). In the example of FIG. 11, the first field 1102 for a first slot indicates that the first slot is not reserved. In contrast, the first field 1102 for a second slot indicates that the second slot is reserved to a first application. Accordingly, a controller (e.g., the controller 106) may load any application into the first slot but only the first application into the second slot based on the diagram 1100. The first field 1102 may correspond to the association 204.

The diagram 1100 further includes a second field 1104 that identifies an application currently loaded into the corresponding slot. In the example of FIG. 11, the second field 1104 for the first slot indicates that a second application is loaded into the first slot. In contrast, the second field 1104 for the second slot indicates that the second slot is empty. A controller may update the second field 1104 upon loading an application into a slot and upon removing the application from the slot.

The diagram 1100 further includes a third field 1106 that identifies an authority level required for reservation of the corresponding slot. In the example of FIG. 11, the third field 1106 for the first slot and second slots indicate that the first and second slots may be reserved by entities with an authority level that satisfies the Admin level (e.g., Admin level or higher). A controller may update the third field 1106 upon slot creation (e.g., by a host, such as the host 102). A controller (e.g., the controller 106) may selectively grant a command (e.g., the command 202) to reserve a slot (e.g., the first program slot 110) based on the third field 1106 for the slot.

While a table is shown, it should be noted that slot information may be stored in other data structures. Further, slot information may include more or fewer fields than illustrated in FIG. 11 in various examples. In addition, the disclosure is not limited to the slots shown. Other examples according to the disclosure include a different number of slots. Further, data shown in the diagram 1100 may be stored in more than one data structure in some examples.

Figure 12:
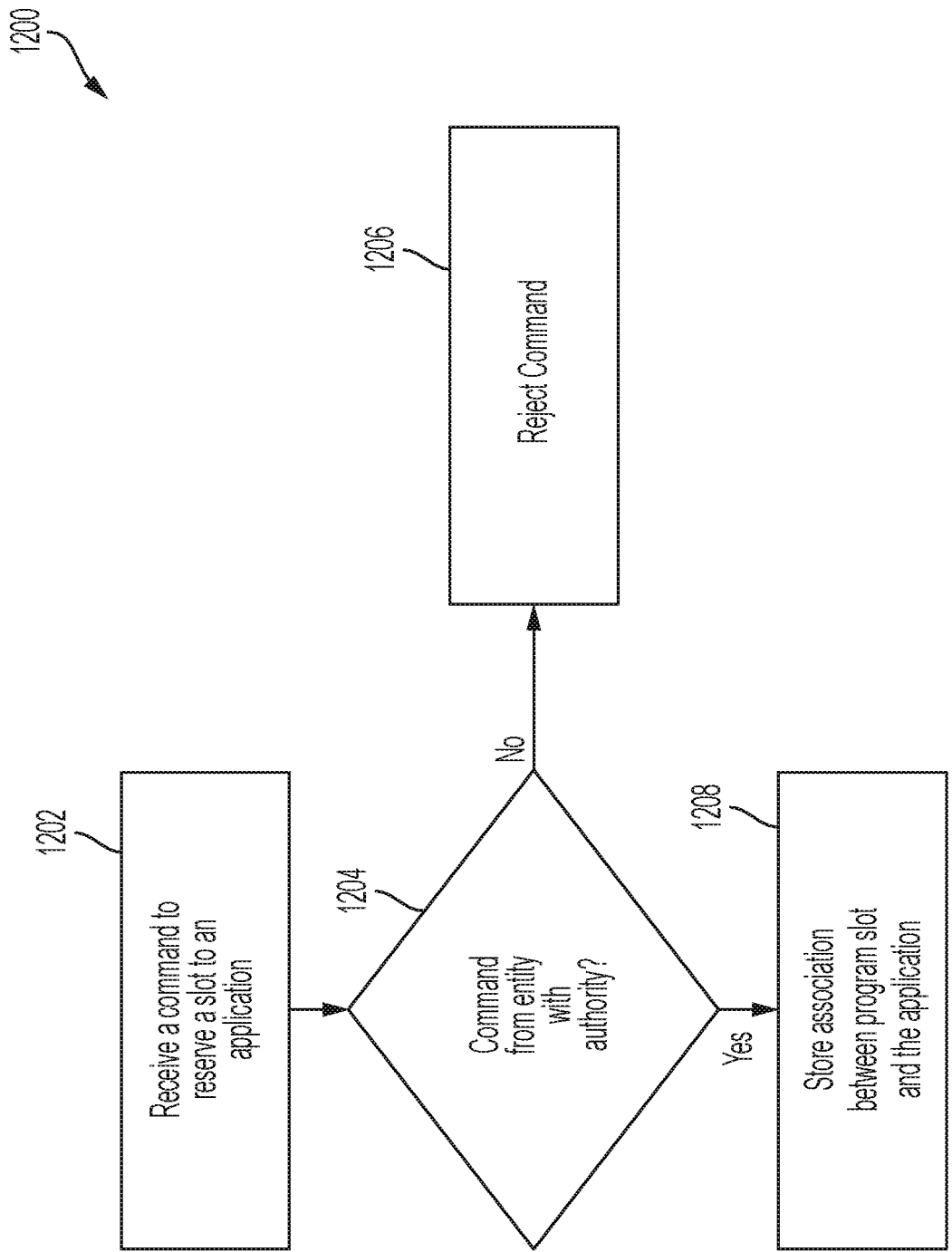
FIG. 12 is a flowchart showing a method of reserving a program slot.

Referring to FIG. 12, a flowchart illustrating a method 1200 of storing an association between a program slot and an application is shown. The method 1200 may be performed by a controller of a computational storage device (e.g., the controller 106). The method 1200 includes receiving a command to reserve a slot to an application, at 1202. For example, the controller 106 may receive the command 202 to reserve the first program slot 110 to the first application 208.

The method 1200 further includes determining whether the command is from an entity with authority to issue the command, at 1204. For example, the controller 106 may determine whether the entity that issued the command 202 has authority to issue a command to reserve the first program slot 110 by determining whether there is a specified authority level for reserving the first program slot 110 and whether the entity that issued the command 202 has the authority level. The controller 106 may determine whether the first program slot 110 has a specified authority level for reserving the first program slot by looking the first program slot 110 up in a data structure similar to the data structure depicted in the diagram 1100 and determining whether the third field 1106 in a row corresponding to the first program slot 110 indicates an authority level required to issue a reservation command for the first program slot 110. The data structure may be stored in the memory 105 or elsewhere. The controller 106 may determine an authority level of the entity that issued the command 202 by looking the entity up in a data structure, such as the one depicted in the table 1000 (for applications) or in a similar host data structure. As shown in FIG. 10, the eighth field 1016 of the data structure indicates an authority level.

In response to determining that the entity does not have authority to issue the command, the method 1200 includes rejecting the command at 1206. For example, the controller 106 may issue a rejection message to the entity (e.g., the host 102 or an application) that issued the command 202 in response to determining that the entity does not have authority to issue the command 202. Alternatively, the controller 106 may simply ignore the command 202 without sending a rejection message.

In response to determining that the entity does have authority to issue the command, the method 1200 includes storing an association between the program slot and the application, at 1208. For example, the controller 106 may store the association 204 indicating that the first program slot 110 is reserved to the first application 208. The association 204 may be stored in a data structure similar to the data structure depicted in the diagram 1100 (e.g., in the first field 1102).

Figure 13:
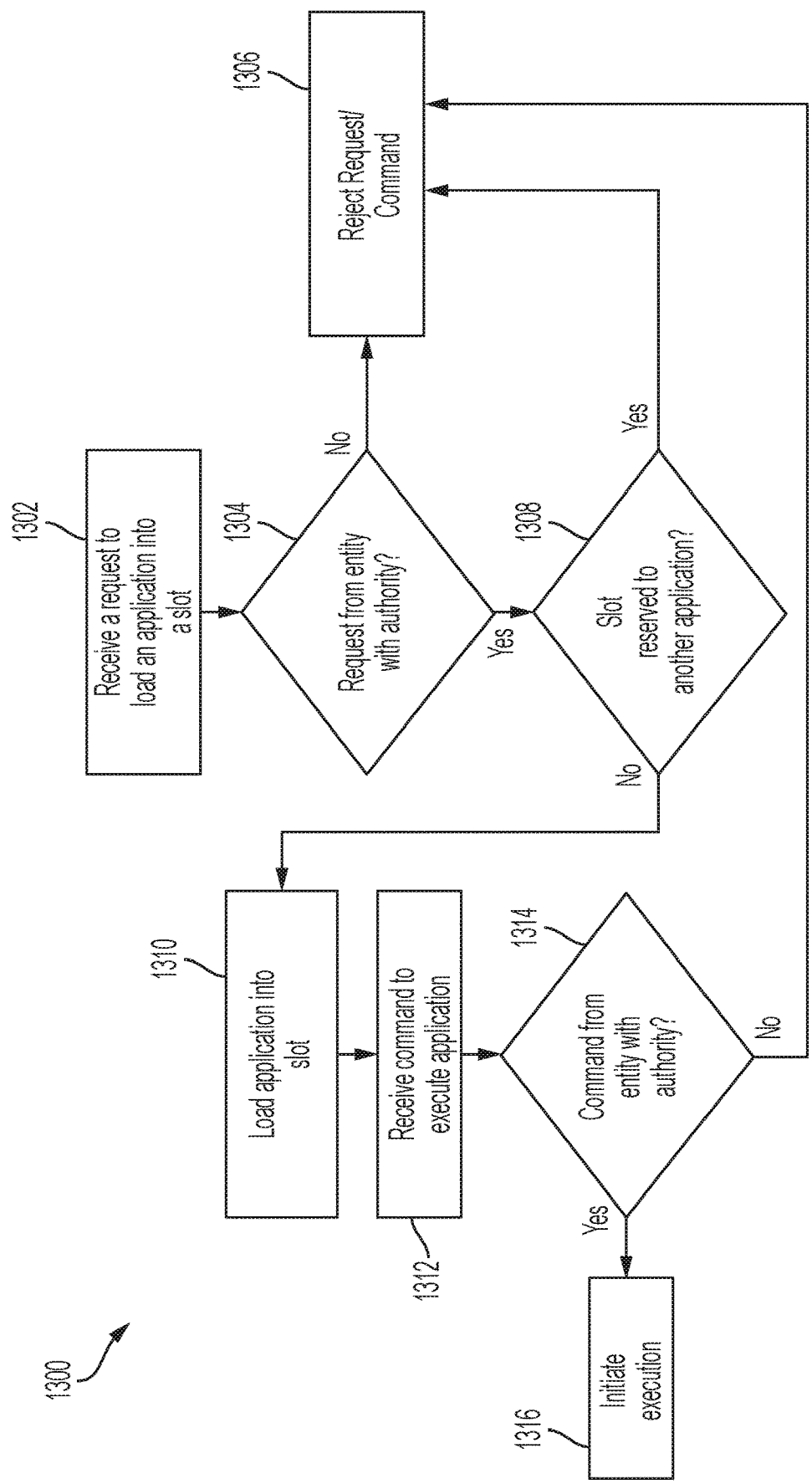
FIG. 13 is a flowchart showing a method of loading and executing an application.

Thus, FIG. 12 illustrates how a slot may be reserved to an application. FIG. 13 is a flow chart illustrating a method 1300 of selectively loading an application into a slot and executing the application.

The method 1300 includes receiving a request to load an application into a slot, at 1302. For example, the controller 106 may receive the command 206 to load the first application 208 into the first program slot 110.

The method 1300 includes determining whether the request is from an entity with authority to issue the request, at 1304. For example, the controller 106 may determine whether the entity that issued the command 206 has authority to load the first application 208 by determining whether there is a specified authority level or designated entity for loading the first application 208 and whether the entity that issued the command 206 has the authority level or corresponds to a designated entity. The controller 106 may determine whether the first application 208 has a specified authority level or designated entity by looking the first application 208 up in a data structure similar to the data structure depicted in the table 1000 and determining whether the sixth field 1012 in a row corresponding to the first application 208 indicates a specified entity or an authority level required to issue a load command for the first application 208. The data structure may be stored in the memory 105 or elsewhere. The controller 106 may determine an authority level of the entity that issued the command 206 by looking the entity up in a data structure, such as the one depicted in the table 1000 (for applications) or in a similar host data structure. As shown in FIG. 10, the eighth field 1016 of the data structure indicates an authority level. Further, in situations in which the entity corresponds to an application, the controller 106 may determine whether the application has a bootstrap privilege by checking the fourth field 1008 of the data structure shown in the table 1000. Applications that do not have a bootstrap privilege or that have a bootstrap privilege restricted to a specific application that does not match the application specified in the command 206 may not be authorized to issue the command 206.

The method 1300 further includes rejecting the request, at 1306, in response to determining that the entity is not authorized to issue the request. For example, the controller 106 may issue a rejection message to the entity (e.g., the host 102 or an application) that issued the command 206 in response to determining that the entity does not have authority to issue the command 206. Alternatively, the controller 106 may simply ignore the command 206 without sending a rejection message.

The method 1300 further includes determining whether the slot is reserved to another application in response to determining that the entity is authorized to issue the request, at 1308. For example, the controller 106 may determine whether the first program slot 110 is reserved to an application other than the first application 208 by consulting a data structure similar to the data structure depicted in the diagram 1100. The first field 1102 associated with the first program slot 110 may indicate whether the first program slot 110 is reserved to another application.

The method 1300 further includes rejecting the request in response to determining that the first program slot 110 is reserved to another application, at 1306. For example, the controller 106 may issue the rejection message 212 to the entity (e.g., the host 102 or an application) that issued the command 206 in response to determining that the first program slot 110 is reserved to another application. Alternatively, the controller 106 may simply ignore the command 206 without sending a rejection message.

The method 1300 further includes loading the application into the slot in response to determining that the program slot is not reserved or is reserved to the application, at 1310. For example, the controller 106 may load the first application 208 into the first program slot 110. Loading the first application 208 may include updating a data structure, such as the data structure shown in the diagram 1100, to indicate that the first application 208 is loaded into the first program slot 110. Further, loading the first application 208 may include passing rights and privileges data (e.g., as shown in the data structure illustrated in the table 1000) to the first application 208. In addition, loading the first application 208 may include downloading the first application 208, retrieving the first application 208 from the storage medium 124 or a combination thereof. Loading the first application 208 may further include sending application data to the processing device 108.

The method 1300 further includes receiving a command to execute the application, at 1312. For example, the controller 106 may receive a command to execute the first application 208.

The method 1300 includes determining whether the command to execute the application is from an entity with authority to issue the command, at 1314. For example, the controller 106 may determine whether the entity that issued the command has authority to execute the first application 208 by determining whether there is a specified authority level or designated entity for executing the first application 208 and whether the entity that issued the command has the authority level or corresponds to a designated entity. The controller 106 may determine whether the first application 208 has a specified authority level or designated entity by looking the first application 208 up in a data structure similar to the data structure depicted in the table 1000 and determining whether the seventh field 1014 in a row corresponding to the first application 208 indicates a specified entity or an authority level required to issue a execute command for the first application 208. The data structure may be stored in the memory 105 or elsewhere. The controller 106 may determine an authority level of the entity that issued the command by looking the entity up in a data structure, such as the one depicted in the table 1000 (for applications) or in a similar host data structure. As shown in FIG. 10, the eighth field 1016 of the data structure indicates an authority level. Further, in situations in which the entity corresponds to an application, the controller 106 may determine whether the application has a bootstrap privilege by checking the fourth field 1008 of the data structure shown in the table 1000. Applications that do not have a bootstrap privilege or that have a bootstrap privilege restricted to a specific application that does not match the application specified in the command 206 may not be authorized to issue the command to execute the first application 208.

The method 1300 further includes rejecting the command in response to determining that the first program slot 110 is reserved to another application, at 1306. For example, the controller 106 may issue a rejection message to the entity (e.g., the host 102 or an application) that issued the command to execute the first application 208 in response to determining that the entity is not authorized to execute the first application 208. Alternatively, the controller 106 may simply ignore the command without sending a rejection message.

The method 1300 further includes initiating execution of the application in response to determining that the entity is authorized to issue the command to execute the application, at 1316. For example, the controller 106 may initiate execution of the first application 208. Initiating execution of the first application 208 may include signaling the processing device 108 to being executing the first application 208.

Thus, the method 1300 may be used to selectively load and execute applications in a computational storage device. The selective loading and execution may take into account various aspects, such as authority level and slot reservations. Accordingly, unauthorized entities may be prevented from loading applications and authorized applications may be prevented from using all available slots. Accordingly, important applications may be guaranteed an available slot.

Figure 14:
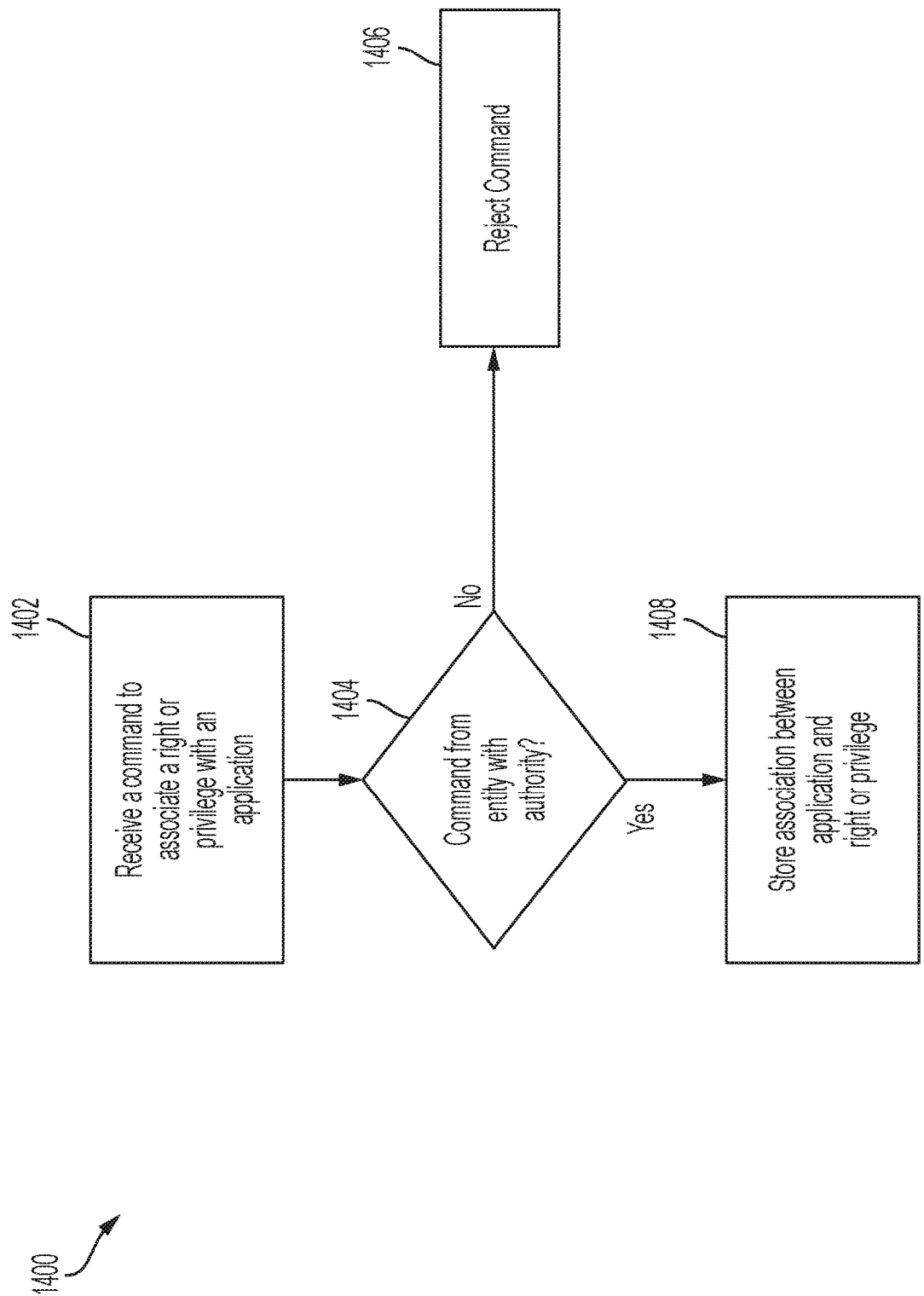
FIG. 14 is a flowchart showing a method of storing an association between an application and a right or privilege.

Referring to FIG. 14, a flowchart of a method 1400 for setting rights or privileges associated with an application is shown. The method 1400 includes receiving a command to associate a right or privilege with an application, at 1402. For example, the controller 106 may receive the command 302 to set application privileges for a first application. The command 302 may correspond to a command to grant a privilege to execute on a particular program slot (e.g., the command 402), a command to grant an application access to data on the storage medium 124 (e.g., the command 502), a command to grant an application a bootstrap privilege (e.g., the command 602), a command to grant an application access to a portion of the memory 105 (e.g., the command 702), a command to set which entity/authority level may load the application, a command to set which authority level/entity may execute the application, a command to set an authority level of the application, or a combination thereof.

The method 1400 further includes determining whether the entity that issued the command is authorized to issue the command, at 1404. For example, the controller 106 may determine whether the entity that issued the command 302 has authority to store the first application privileges 304. The controller 106 whether the entity has authority by checking an authority level of the entity and comparing the authority level to a target authority level. The controller 106 may determine an authority level of the entity that issued the command 302 by looking the entity up in a data structure, such as the one depicted in the table 1000 (for applications) or in a similar host data structure. As shown in FIG. 10, the eighth field 1016 of the data structure indicates an authority level. The target authority level may be an authority level associated with a resource specified in the command 302. For example, virtual memory space may have a particular authority level.

The method 1400 further includes rejecting the command in response to determining that the entity does not have permission to issue the command, at 1406. For example, the controller 106 may issue a rejection message to the entity (e.g., the host 102 or an application) that issued the command 302 in response to determining that the entity is not authorized. Alternatively, the controller 106 may simply ignore the command without sending a rejection message.

The method 1400 further includes storing an association between the application and the right or privilege in response to determining that the entity is authorized, at 1408. For example, the controller 106 may store the first application privileges 304 in the memory 105. Storing the first application privileges 304 may include updating a data structure such as the data structure depicted in the table 1000.

Figure 15:
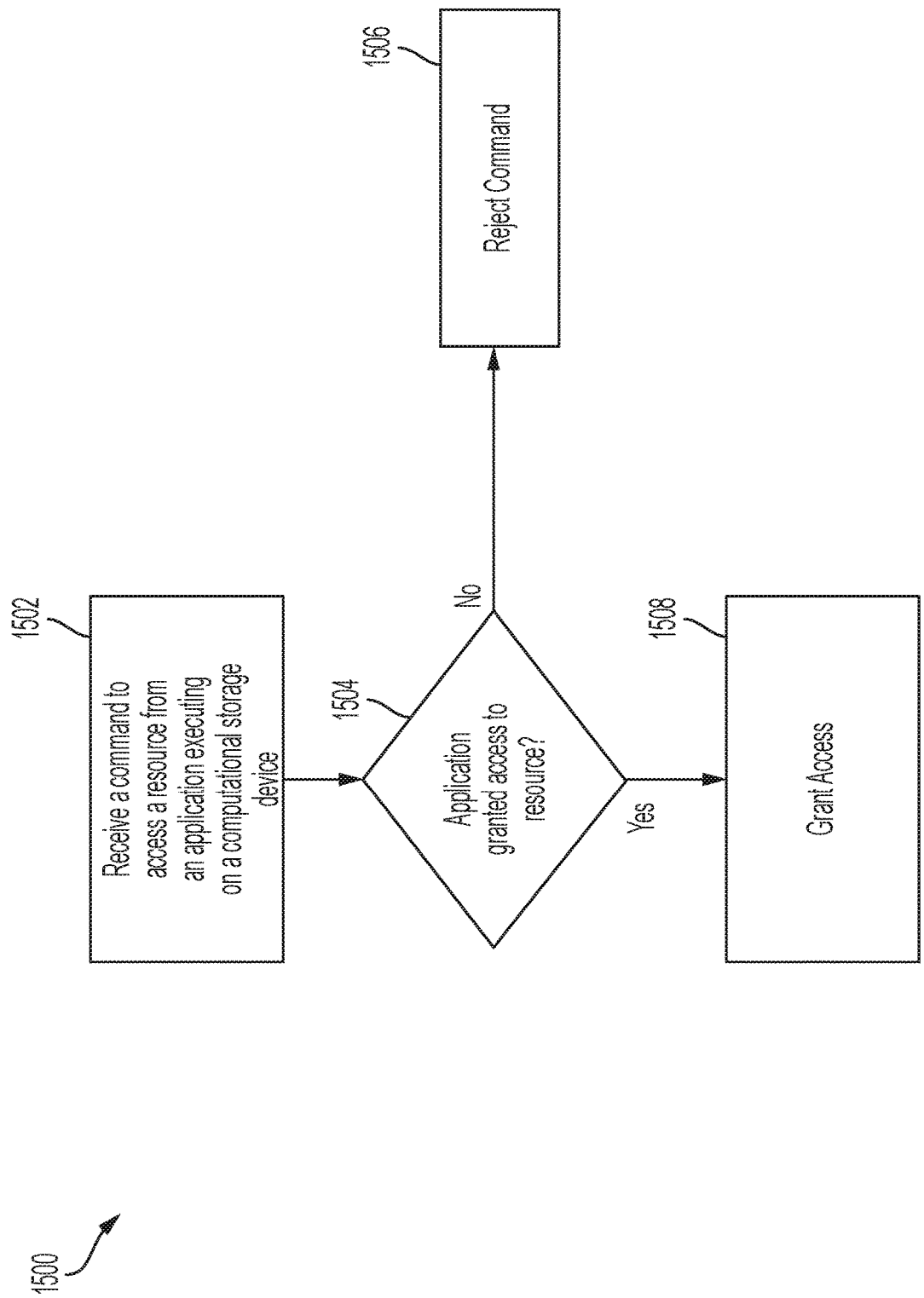
FIG. 15 is a flowchart showing a method of granting access to a resource by an application executing on a computational storage device.

Referring to FIG. 15, a flowchart illustrating a method 1500 of selectively granting an application access to a resource is shown. The method 1500 includes receiving a command to access a resource from an application executing on a computational storage device, at 1502. For example, the controller 106 may receive the request 508 for the first data 126 from the first application 506. As another example, the controller 106 may receive a request from the first application 706 to access the first memory space 708.

The method 1500 further includes determining whether the entity that issued the command is authorized to issue the command, at 1504. For example, the controller 106 may determine whether the first application 506 has access to the (or a particular type of access) to the first data 126 by looking the first application 506 up in a data structure similar to the data structure depicted in the table 1000 and determining whether the corresponding second field 1004 grants access (or the particular type of access) to the first data 126. Similarly, the controller 106 may determine whether the first application 706 has access (or a particular type of access) to the first memory space 708 by determining whether the corresponding third field 1006 grants access (or the particular type of access) to the first memory space 708.

The method 1500 further includes rejecting the command in response to determining that the entity does not have permission to issue the command, at 1506. For example, the controller 106 may issue a rejection message to the first application 506 (or first application 706) in response to determining that the first application 506 is not authorized to access the first data 126 (or first memory space 708). Alternatively, the controller 106 may simply ignore the command without sending a rejection message.

The method 1500 further includes granting access to the resource in response to determining that the application is authorized, at 1508. For example, the controller 106 may facilitate access to the first data 126 (e.g., forward a command, translate the command, etc.) in response to determining that the first application 506 is authorized to access the first data 126. Similarly, the controller 106 may facilitate access to the first memory space 708 by the first application 706.

Thus, FIGS. 14 and 15 illustrate methods for setting privileges associated with applications running on a computational storage device and enforcing the privileges. These methods may prevent one tenant's application from accessing resources assigned to another tenant.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an radio frequency identification (RFID) element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    receiving, at a controller of a storage device, a first command reserving a first program slot of a processing device of the storage device to an application, wherein the processing device further comprises a second program slot, wherein the first program slot and the second program slot correspond to logical representations of the processing device, and wherein the first command is received from a first source;
    determining that the first source is authorized to reserve the first program slot based on access information associated with the first source;
    storing, by the controller of the storage device, an association between the first program slot and the application based on the access information;
    receiving, at the controller of the storage device, a first request to load the application into the first program slot;
    determining, by the controller of the storage device, that the application is permitted to execute in the first program slot based on the association and the first request;
    loading, by the controller of the storage device, the application into the first program slot based on the first request; and
    executing, at the processing device of the storage device, the application in the first program slot.

2. The method of claim 1, further comprising:
    receiving, at the controller of the storage device, a second request to load a second application into the first program slot; and
    rejecting, by the controller of the storage device, the second request based on the access information associated with the first source.

3. The method of claim 1, wherein the first request to load the application is received from a second application executing at the processing device.

4. The method of claim 1, further comprising receiving, at the controller of the storage device, a second request to associate one or more permissions with the application and storing an indication of the one or more permissions to the access information.

5. The method of claim 4, wherein the one or more permissions include a permission to load a second application into the processing device.

6. The method of claim 5, wherein the one or more permissions further indicates one or more second permissions of the second application.

7. The method of claim 4, wherein the one or more permissions identify a storage space accessible to the application.

8. The method of claim 7, wherein the storage space comprises a namespace, a file, a logical block address range, or a combination thereof.

9. The method of claim 4, wherein the one or more permissions identify a virtual address space of a memory accessible to the application.

10. The method of claim 1, further comprising:
    receiving a second command to disable the first program slot;
    clearing the application from the first program slot; and
    rejecting a second request to load the application into the first program slot.

11. A computational storage device comprising:
    a processing device;
    a memory; and
    a controller configured to:
        receive a first command reserving a first program slot of the processing device to an application, wherein the processing device further comprises a second program slot, wherein the first program slot and the second program slot correspond to logical representations of the processing device, and wherein the first command is received from a first source;
        determine that the first source is authorized to reserve the first program slot based on access information;

store an association between the first program slot and the application in the memory based on the access information associated with the first source;
receive a first request to load the application into the first program slot;
determine that the application is permitted to execute in the first program slot based on the association and the first request;
load the application into the first program slot based on the first request; and
initiate execution of the application in the first program slot at the processing device.

12. The computational storage device of claim 11, wherein the controller is further configured to:
receive a second request to load a second application into the first program slot; and
reject the second request based on the access information associated with the first source.

13. The computational storage device of claim 11, wherein the first request to load the application is received from a second application executing at the processing device.

14. The computational storage device of claim 11, wherein the controller is further configured to receive a second request to associate one or more permissions with the application and to store an indication of the one or more permissions to the access information.

15. The computational storage device of claim 14, wherein the one or more permissions include a permission to load a second application into the processing device.

16. The computational storage device of claim 15, wherein the one or more permissions further indicate one or more second permissions of the second application.

17. The computational storage device of claim 14, further comprising a storage medium, wherein the one or more permissions identify a storage space associated with the storage medium and accessible to the application.

18. A non-transitory computer readable storage device storing instructions executable by a controller to:
receive a first command reserving a first program slot of a processing device to an application, wherein the processing device further comprises a second program slot, wherein the first program slot and the second program slot correspond to logical representations of the processing device, and wherein the first command is received from a first source;
determine that the first source is authorized to reserve the first program slot based on access information associated with the first source;
store an association between the first program slot and the application in a memory based on the access information;
receive a first request to load the application into the first program slot;
determine that the application is permitted to execute in the first program slot based on the association and the first request;
load the application into the first program slot based on the first request; and
initiate execution of the application in the first program slot at the processing device.

19. The non-transitory computer readable storage device of claim 18, wherein the instructions are further executable by the controller to:
receive a second request to load a second application into the first program slot; and
reject the second request based on the access information associated with the first source.

20. The non-transitory computer readable storage device of claim 18, wherein the first request to load the application is received from a second application executing at the processing device.

* * * * *